April 27, 1971   W. J. SCHRENK ET AL   3,576,707

MULTILAYER IRIDESCENT PLASTIC ARTICLES

Original Filed March 29, 1965   6 Sheets-Sheet 1

INVENTORS.
Walter J. Schrenk
Douglas S. Chisholm
Kenneth J. Cleereman
Turner Alfrey, Jr.

BY *Robert B...* AGENT

ATTORNEY

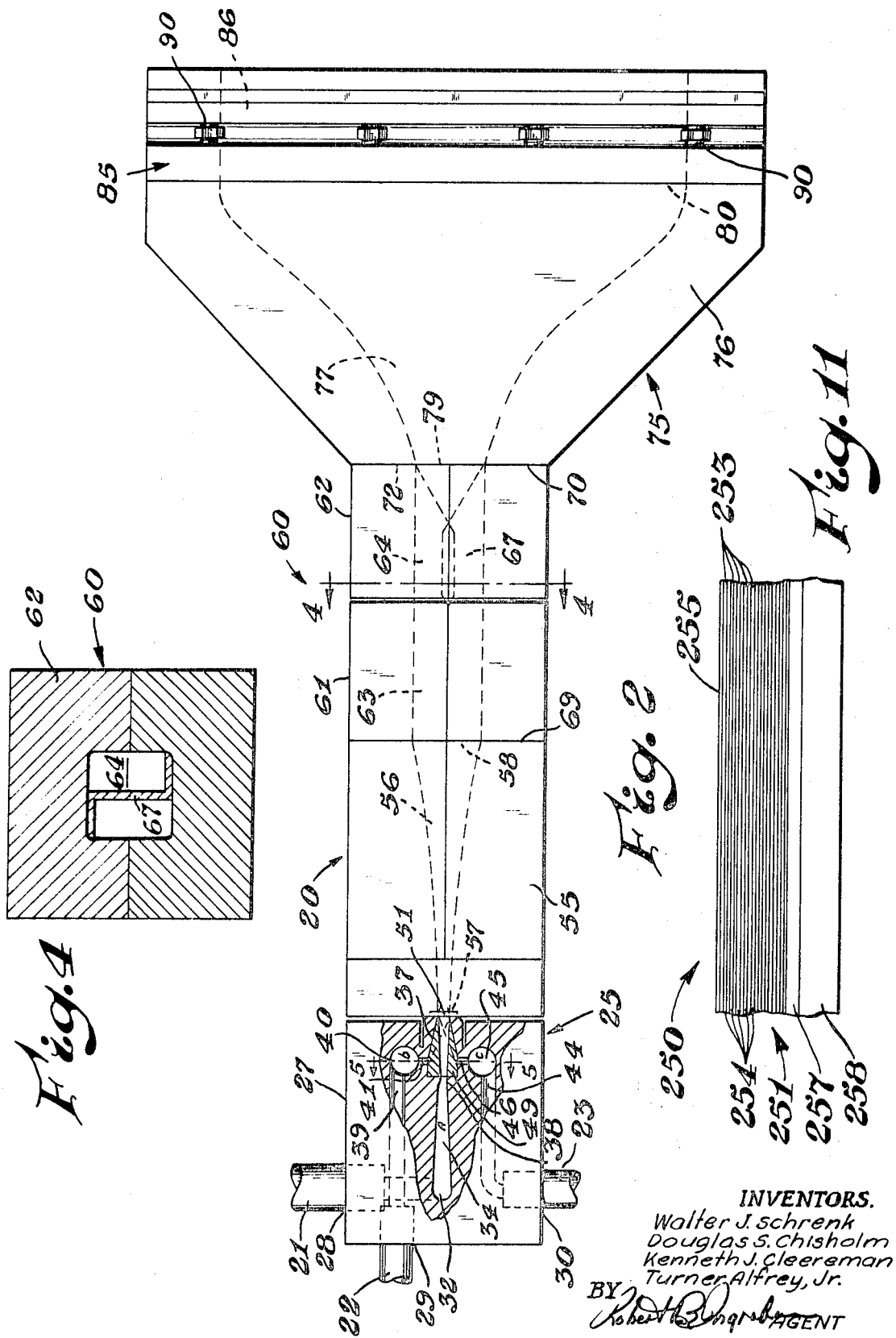

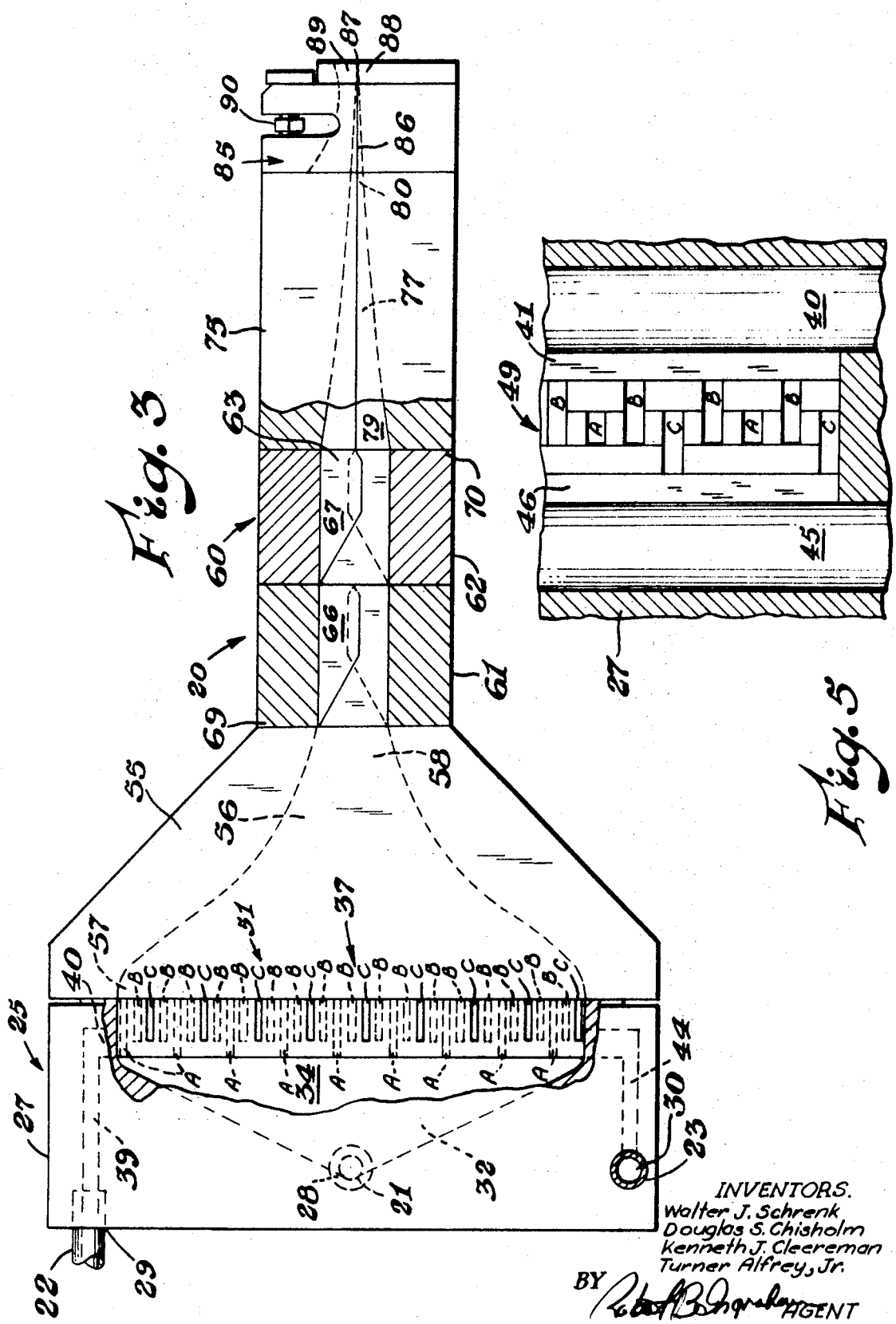

INVENTORS.
Walter J. Schrenk
Douglas S. Chisholm
Kenneth J. Cleereman
Turner Alfrey, Jr.

BY
ATTORNEY

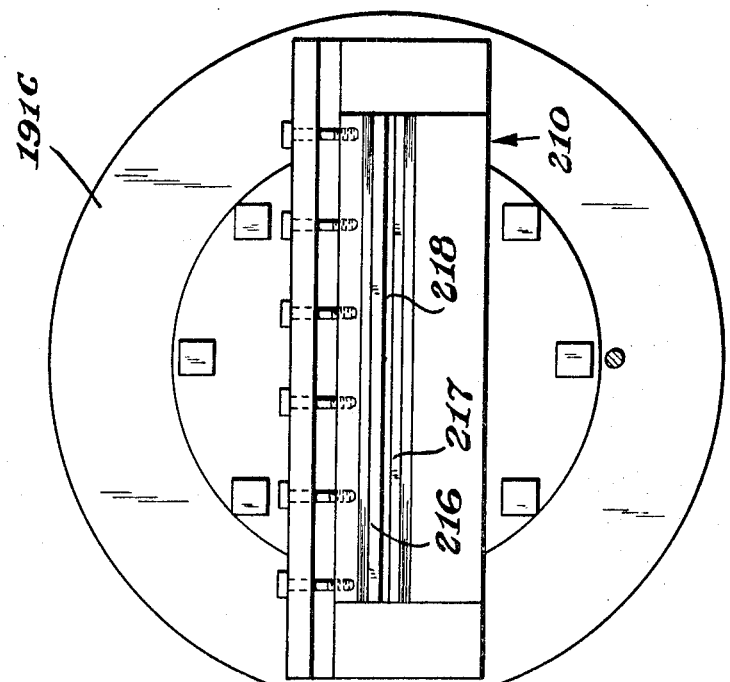
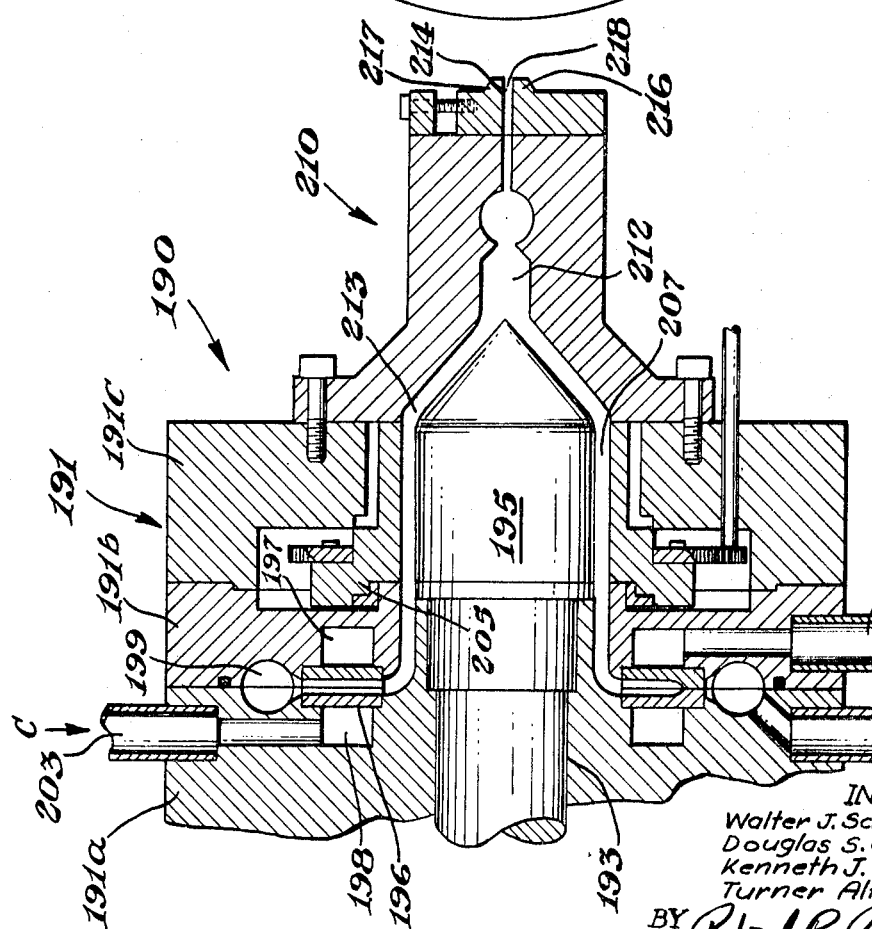
Fig. 8
Fig. 7
INVENTORS.
Walter J. Schrenk
Douglas S. Chisholm
Kenneth J. Cleereman
Turner Alfrey, Jr.
BY *Robert B. Ingraham*
AGENT
ATTORNEY April 27, 1971  W. J. SCHRENK ET AL  3,576,707
MULTILAYER IRIDESCENT PLASTIC ARTICLES
Original Filed March 29, 1965  6 Sheets-Sheet 6

INVENTORS.
Walter J. Schrenk
Douglas S. Chisholm
Kenneth J. Cleereman
Turner Alfrey, Jr.
BY
AGENT
ATTORNEY United States Patent Office 3,576,707
Patented Apr. 27, 1971

3,576,707
MULTILAYERED IRIDESCENT PLASTIC
ARTICLES
Walter J. Schrenk, Bay City, and Douglas S. Chisholm,
Kenneth J. Cleereman, and Turner Alfrey, Jr., Midland, Mich., assignors to The Dow Chemical Company,
Midland, Mich.
Continuation of abandoned application Ser. No. 445,851,
Mar. 29, 1965, which is a continuation-in-part of application Ser. No. 431,336, Feb. 9, 1965. This application June 6, 1969, Ser. No. 863,729
Int. Cl. B32b 7/02, 27/08
U.S. Cl. 161—164                        14 Claims

ABSTRACT OF THE DISCLOSURE

Multiple layer films are made by arranging a minimum of two streams into one stream having a plurality of generally parallel layers. By mechanically manipulating the layered stream an increased number of layers are obtained and the manipulating stream is shaped into a desired configuration having a plurality of layers generally adjacent to a major surface thereof. Under certain conditions, iridescent products are obtained without the use of pigment.

This application is a streamlined continuation of application Ser. No. 445,851, filed Mar. 29, 1965, which in turn is a continuation-in-part of Ser. No. 431,336, filed Feb. 9, 1965, both now abandoned.

This invention relates to the preparation of plastic articles. It more particularly relates to a method and apparatus for the production of multilayer articles.

Oftentimes it is desirable to prepare synthetic resinous film and sheet wherein a plurality of components are arranged in laminar fashion to provide desired characteristics. Many methods and techniques have been used including the preparation of individual films or sheets and lamination by means of adhesives or by utilizing one of the layers as a melt adhesive. In general such techniques are generally time consuming and expensive and do not offer the choice of varying thickness of the various layers of the laminates without difficulty. For example, where various layers are prepared by means of adhering two or more sheets together, sheets must be obtained of the desired thickness and subsequently laminated. Some laminates are generated by the simultaneous extrusion of diverse plastic materials into a 2, 3, 4 or even 5 layer configuration. Such multiple film is prepared utilizing equipment which has about one feed port for each layer in the resultant film. To prepare film having a great number of layers such as 100 or 1,000 layers, the mechanical problems and expense are usually considered prohibitive.

It is an object of this invention to provide a method and apparatus for the manufacture of multilayer composite thermoplastic resinous film employing equipment having a number of feed ports substantially less than the number of layers in the resultant film.

A further object of this invention is to provide a multilayer thermoplastic resinous film having an iridescent appearance.

Another object of the invention is to provide an inexpensive method and apparatus for the production of such film.

These features and other advantages in accordance with the method of the present invention are achieved by providing a composite stream of thermoplastic resinous material comprising at least two diverse thermoplastic resinous materials in heat plastified form, deforming the stream to provide a second stream of heat plastified thermoplastic resinous material containing a plurality of layers of diverse thermoplastic resinous material in heat plastified form, forming the stream into a desired configuration having at least one major surface wherein the layers of the stream lie generally parallel to the major surface thereof.

Within the scope of the present invention is an apparatus for the preparation of a composite article comprising means to provide at least two streams of heat plastified thermoplastic resinous material, means to mechanically arranged the two streams into one stream having a plurality of generally parallel layers, means to mechanically manipulate the stream to provide an increased number of layers, and means to shape the stream into a desired configuration having a plurality of layers generally parallel to a major surface of the desired configuration.

The article of the invention comprises a thermoplastic resinous body having at least about 10 layers of resinous materials therein, wherein contiguous adjacent layers are of diverse resinous material and at least 20 percent of the layers have a thickness of from about 0.05 micron to about 5 microns and preferably from about 0.05 micron to about 1 micron for maximum iridescent effects, and said 20 percent of the layers are disposed entirely within the body.

Further features and advantages of the invention will become more apparent from the following specification when taken in connection with the drawing wherein:

FIG. 2 is a partially cutaway view of one embodiment of an apparatus in accordance with the invention;

FIG. 3 is a partially cutaway elevational view of the apparatus of FIG. 2;

FIG. 4 is a cross section of the apparatus of FIG. 2 taken along the line 4—4;

FIG. 5 is a fragmentary sectional view of the feed block or port arrangement of the apparatus of FIGS. 2 and 3;

Figure 6:
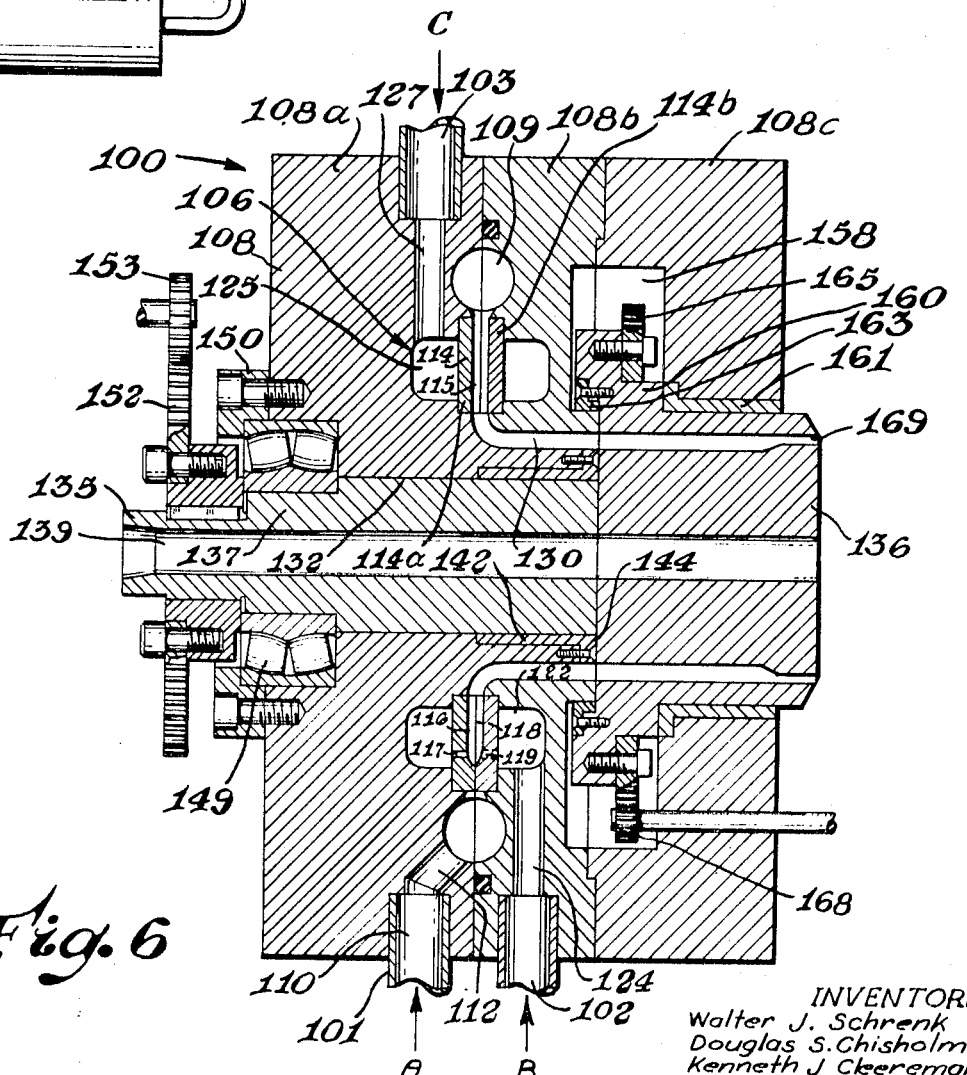
FIG. 6 is an alternate embodiment of the invention employing a rotary die.
Figure 6A:
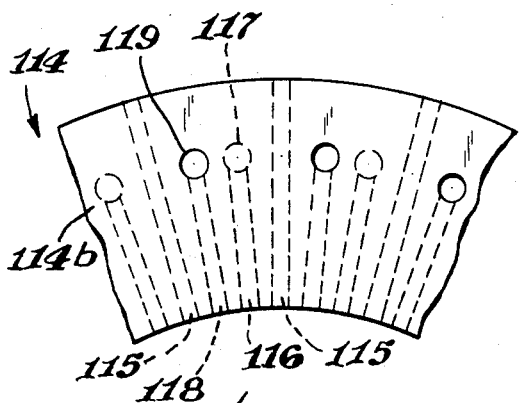
FIGS. 6A, 6B and 6C are fragmentary views of a feed port block or distribution manifold or manifolds suitable for use in the apparatus of FIG. 6.
Figure 6B:
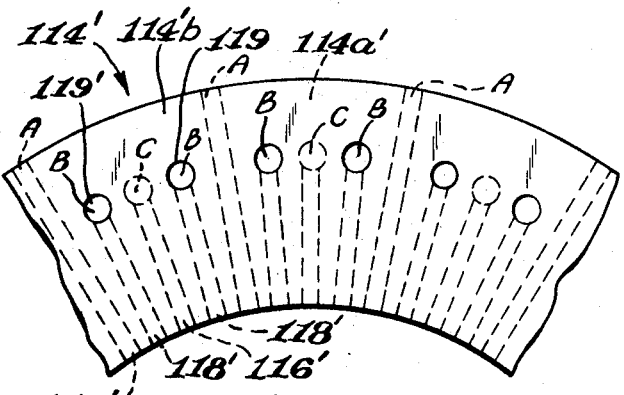
Figure 6C:
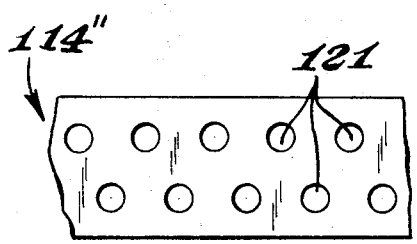
Figure 6D:
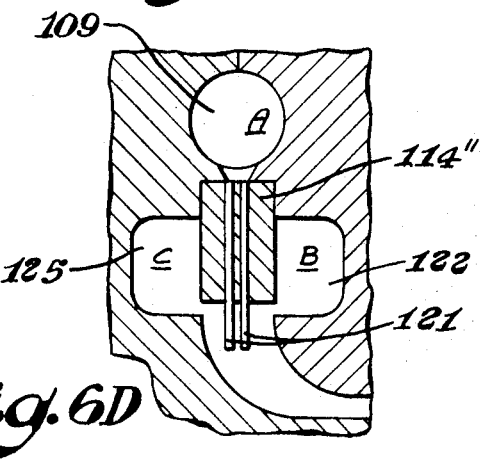
FIG. 6D is a sectional view of an alternate embodiment of the invention wherein a plurality of filaments are encapsulated within a plastic body.
Figure 6E:
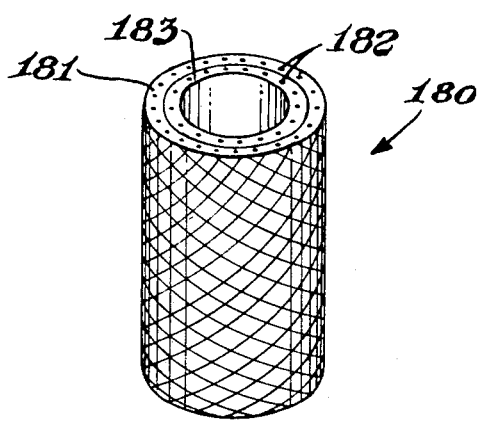
Figure 6F:
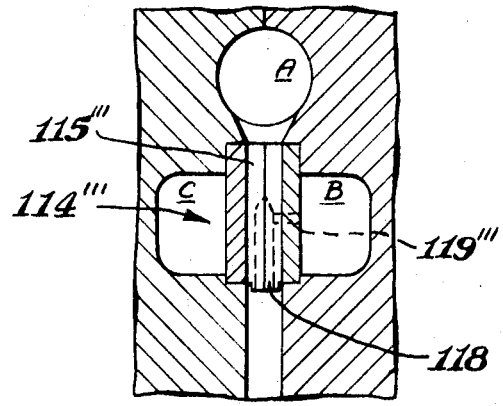
Figure 8A:
Figure 9:
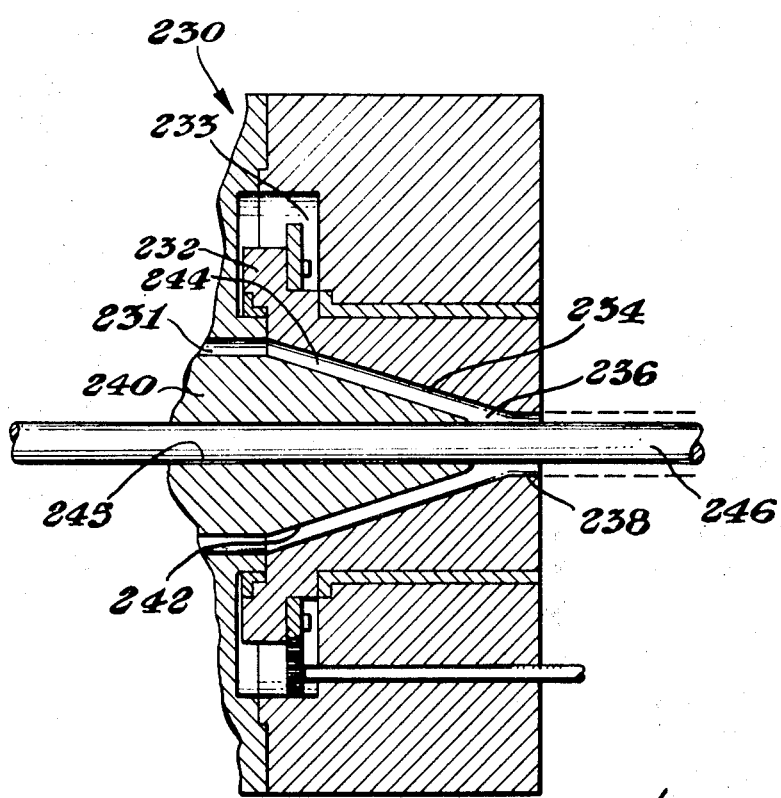
Figure 10:
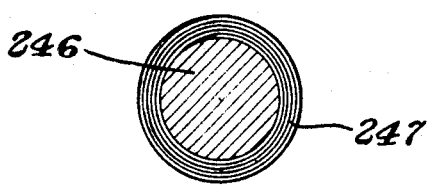

FIG. 6E discloses a product employing the feed port arrangement of FIG. 6D;

FIG. 6F depicts an alternate feed port arrangement to be utilized with the embodiment of FIG. 6;

FIGS. 7 and 8 are two views of an alternate embodiment of the invention;

FIG. 8A schematically depicts the product obtained from the apparatus of FIGS. 7 and 8;

FIG. 9 is a sectional view of a modification of the apparatus of FIG. 6;

FIG. 10 is a schematic sectional view of a product obtained from the modification of FIG. 9;

FIG. 11 depicts a partial end view of a multilayer iridescent film in accordance with the invention.

Figure 1:
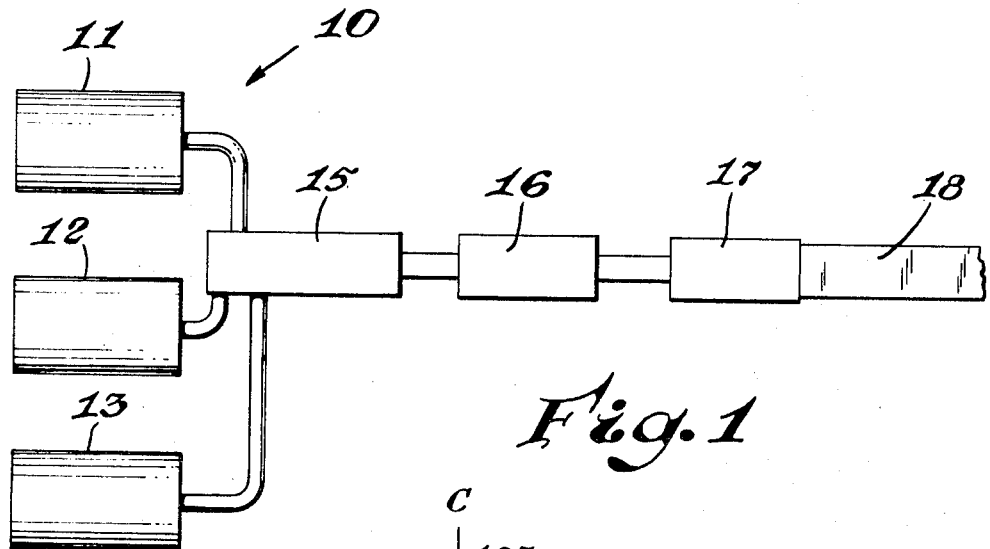
FIG. 1 is a schematic representation of the method and apparatus of the invention.

In FIG. 1 there is schematically depicted a basic apparatus in accordance with the invention generally designated by the reference numeral 10. The apparatus 10 comprises in cooperative combination a first source of heat plastified thermoplastic resinous material 11, a second source of heat plastified thermoplastic resinous material 12, and optionally, a third source of heat plastified thermoplastic resinous material 13, a combining means 15 adapted to receive heat plastified material from the sources 11, 12 and 13 and arrange them in adjacent layered relationship in a stream, a layer multiplying means 16 in communication with the combining means 15 wherein the stream of heat plastified thermoplastic material is physically rearranged to provide at least an apparent increase in the number of layers, a shaping die 17 is adapted to receive the stream from the layer multiplying means 16 so constructed and arranged so as to permit substantially streamline flow and to shape the stream to a desired configuration. The reference numeral 18 indicates a layered product prepared by the apparatus 10.

FIGS. 2–4 depict partially cutaway views of one embodiment of the invention generally designated by the reference numeral 20. The apparatus 20 comprises in cooperative combination a first heat plastified thermoplastic resinous source 21, a second heat plastified thermoplastic resinous source 22, and a third heat plastified thermoplastic resinous source 23, the sources 21, 22 and 23 are in operative communication with a distributing or layering means generally designated by the reference numeral 25. The distribution means 25 comprises a housing 27. The housing 27 defines a first polymer inlet 28 in operative cooperation with the first source 21, a second polymer inlet 29 in operative combination with the second source 22, and a third inlet 30 in combination with the third source 23. The inlet 28 is in full communication with an internally disposed passageway 32 terminating remote from the inlet 28 in a plenum or chamber 34. The housing 27 defines an internally disposed layering chamber 37 which is in communication with the chamber 34 by means of the passage 38. The second passageway 29 is in communication with a passageway 39 which terminates in a distribution plenum 40. The plenum 40 in turn is in communication with the layering chamber 37 by means of the passageway 41. The inlet 30 is in full communication with the third passageway 44 which in turn terminates at a distribution plenum 45. The distribution plenum 45 communicates with the layering or distribution chamber 37 by means of the passageway 46. A layering or feed block 49 is disposed within the chamber 37. The layering block 49 has defined therein a plurality of orifices indicated by the letters A, B and C which are so constructed and arranged so that the passageways designated by A communicate with the chamber 34, the passageways designated by B communicate with the distribution plenum 40, and those designated as C communicate with the distribution plenum 45.

FIG. 5 depicts a view of the layering block 49 illustrating the channels A, B and C when the housing 27 only is sectioned along the line 5—5 of FIG. 2. The layering chamber 37 terminates in a generally rectangular orifice 51 remote from the passageways 38, 41 and 46. Disposed adjacent the housing 27 is a stream shaping housing or transition piece 55. The transition piece 55 defines an internal passageway 56 having a first end 57 and a second end 58. The first end 57 of the passageway 56 has a cross sectional configuration substantially equivalent to that of the orifice or slot 51. The end of the housing 55 has disposed therein the passageway end 57 which is in sealing engagement with the housing 27. The cross sectional configuration of the passageway 56 varies from an elongated slot at the first end 57 to a substantially spaced rectangular configuration at the second end 58. Beneficially the cross sectional configuration of the passageway 56 has a constant cross sectional area. A layer multiplying means 60 is disposed adjacent the transition piece 55. The layer multiplying means 60 comprises a first housing 61 and a second housing 62. The housing 61 defines a generally rectangular internal passageway 63. The housing 62 defines an internal passageway 64 of generally rectangular cross section. The housing 61 is in sealing engagement with the housing 55 adjacent the second end 58 of the passageway 56 in such a manner that the passageway 63 is in full communication with the second end 58 of the passageway 56. The housing 62 is in sealing engagement with the housing 61 in such a manner that the passageways 63 and 64 are substantially coaxial. A stream dividing and recombining means which increases the number of layers in a stream is disposed with a passageway 63, and a similar dividing and recombining means 67 is disposed within the passageway 64. The operation of such dividing and recombining means are set forth in U.S. Pat. 3,051,453, and need not be repeated herein. FIG. 4 is a sectional view taken along the line 4—4 of FIG. 2. The multiplying section 60 has a first end 69 and a second or terminal end 70 having an inlet opening 71 and an outlet opening 72. A stream shaping section or transition piece 75 is disposed adjacent the second end 70 of the stream shaping portion 60. The transition piece 75 comprises a housing 76 having defined therein an internal passageway 77. The housing 76 is in sealing engagement with the second end 70 of the housing 60. The passageway 77 has a first opening 79 substantially commensurate in cross section with the cross section of the opening 72. The passageway 77 terminates in a second end or opening 80 having a generally slot-like configuration. Beneficially the cross sectional configuration of the passageway 77 is maintained at a constant cross sectional area from the essentially square configuration 79 to the elongated slot-like configuration 80. A sheet or sheeting die 85 is disposed in sealing relationship with the second end 80 of the passageway 77 of the housing or transition piece 75. The sheeting die 85 defines an internal passageway 86 which communicates with the second end 80 of the passageway 77 and terminates remote therefrom in the extrusion orifice 87 defined by the fixed die lip 88 and an adjustable dip lip 89. Positioning of the adjustable die lip 89 is accomplished by means of screws 90.

In operation of the embodiment of the present invention depicted in FIGS. 2–5, heat plastified thermoplastic resinous material is supplied to the chambers 34, 40 and 44. From the chamber 44 the polymer A is extruded as a plurality of strips from the apertures designated as A. A plurality of thin strips of the polymer B emerge from the slots or apertures indicated by the letters B and polymer C is extruded from the slots or apertures indicated as C. Thus the sequence of layers or strips is ABC ABC ABC ABC . . . entering the opening 51 of the transition piece 55. The stream at the entrance 51 of the transition piece 55 comprises a plurality of heat plastified thermoplastic resinous streams in edge to edge relationship wherein the materials extend from one major surface of the stream to the opposite. As this layered stream passes through the passageway 56 of the transition piece 55, the width of the sheet is decreased and the thickness increased until the stream acquires an essentially square cross section at the exit 58. The stream portions maintain their relative location to one another and no rotation of the flow lamina occurs. On passing through the stream multiplying section 60, the stream is divided and recombined to provide a stream entering the passageway 77 of the transition piece 75 having about 4 times the number of layers that entered the stream multiplying section. The transition piece 75 reshapes the essentially square stream emerging from the stream multiplying section 60 to expand the stream in a direction parallel to the major surfaces of the layers in the stream, and the stream is finally extruded through the sheeting die 85 as a thin sheet or film. Thus in the particular embodiment illustrated, the number of layers in the extruded film is about 4 times the number of feed ports employed. The number of layers is readily increased by increasing the number of stream multiplying sections such as 61 and 62.

In FIG. 6 there is illustrated an alternate embodiment of the invention designated by the reference numeral 100. The apparatus 100 comprises in cooperative combination a first polymer source 101 also indicated as supplying stream A, a second polymer source 102 indicated as supplying stream B and a third polymer source 103 indicated as supplying stream C. The polymer or sources 101, 102, and 103 are in cooperative combination with a polymer distributing section generally indicated by the reference numeral 106. The polymer distributing section 106 is defined by a housing 108. The housing 108 is made up of housing sections 108a, 108b and 108c. The housing 108 defines a generally toroidal or annular cavity 109. Adjacent the polymer source 101 is an opening 10 in the housing 108. The opening 110 communicates with the generally toroidal chamber 109 by means of a passageway 112. Generally adjacent to the annular passageway or cavity 109 is a feed block 114 comprising a first portion 114a and a second portion 114b. The portions 114a and 114b are assembled in mating relationship to form a plurality of slots or passageways 115, generally radially extending entirely through the ring 114 and the outermost circumferential portion of the slots being in communication with the generally torodial chamber 109. A second series of radially extending slots 116 are disposed within the distribution block 114. The slots 116 terminate in openings adjacent the inner open ends of the slots 115 and communicate with a side of the distribution block 114 by means of a plurality of passageways 117 in the ring portion 114a. Also interspaced between the slots 115 and 116 are a plurality of slots 118 generally commensurate with the slots 116, but communicating with the outer phase of the ring portion 114b by means of the passageways 119. The configuration of the slots is made clear in fragmentary view FIG. 6A taken along the line A—A of FIG. 6 wherein the relationship of these slots is illustrated more clearly. The distributor block 114 in combination with the housing 108 defines a second annular chamber or passageway 122 which is in communication with the passageways 119 formed in the distributor block half 114b. A passageway 124 provides communication between the polymer source 102 and the annular passageway 122. A third annular passageway 125 is defined in the housing 108 and by the distributor block 114. The chamber 125 is in communication with the polymer source 103 by means of the passageway 127. A generally annular passageway 130 is formed within the housing 108 and communicates with the portions of the slots or passageways 115, 116, and 118 remote from the annular passageways 109, 122 and 125. The passageway 130 smoothly curves into a generally annular configuration to permit streamline flow of fluid within the passageway. The housing portion 108a defines a generally cylindrical centrally disposed cavity 132. The cavity 132 is substantially coaxial with the passageway 130. Rotatably supported within the passageway 132 is a mandrel generally designated by the reference numeral 135. The mandrel 135 comprises a die portion 136 and a body portion 137. A central passageway 139 is defined within the mandrel 135 providing substantially end to end communication therein. A bearing 142 is disposed within the housing portion 108a and engages the body portion 137 and a shoulder 144 formed on the die portion 136. A second bearing 149 is disposed partially within the housing 108 and carries the body portion 137. The bearing 149 is maintained in position by the retainer 150. A gear or rotating means 152 is secured to the body portion of the mandrel 137 and is in engagement with a power source such as the pinion 153. The housing portions 108b and 108c define an internal annular die receiving cavity 158. The cavity 158 is coaxially arranged with the passageway 130 and the mandrel 135. Rotatably positioned within the cavity 158 is an external die member 160. The die member 160 is supported within the cavity 158 by means of the bearing member 161 and the integrity of the annular passageway 130 is maintained by means of the seal 163, secured to the die member 160 and in sealing rotatable engagement with the housing portion 108b. A ring gear 165 is rigidly affixed to the die member 160 and is rotated by the power source or pinion 168 rotatably mounted in the housing portion 108c. The die member 160 is coopera-tion with the die portion 136 forms the annular extrusion orifice 169. In operation of the embodiment of the invention illustrated in FIGS. 6 and 6A, thermoplastic materials or polymers follow the paths indicated by the arrows; that is, polymer A enters the passageway 112, flows in and about the annular chamber 109 through the passages 115 and into the annular orifice 130. Polymer B from the source 102 flows through the passage 124 into the annular chamber 122 through the passages 119 into the radially extending slots 118 and into the annular passageway 130. Polymer C from the source 103 flows through the passageway 127 into the annular chamber 125 and from the chamber 125 into the radially disposed slots 116 and into the annular passageway 130. Employing the feed port arrangement as illustrated in FIG. 6A the stream flowing in the annular passageway 130 adjacent the feed port, i.e., in the stationary portion of the passageways, comprises a plurality of radially extending layers composed of polymers ABC, ABC, ABC. On entering the portion of the annular passageway 130 defined by the die portion 136 of the mandrel 135 and the external die portion 160, the various radially extending layers are transformed into spirally disposed layers when a difference in rotational speed exists between the mandrel 135 and the external die portion 160. Advantageously, the external die portion 160 and the mandrel 135 are rotated in opposite directions in order to achieve a maximum spiral for a minimal residence time within the annular passageway 130. The product discharged at the extrusion orifice 169 comprises a multilayer tube having a plurality of spirally disposed components extending from the inner surface to the outer surface, the spiral configuration being determined by the linear rate of travel of material through the rotating portion of the passageway 130 and the rates of rotation of the external die portion 160 and the mandrel 135.

In FIG. 6B there is illustrated an alternative arrangement of a feed or distribution block 114' comprising a first half 114'a and 114'b, radially extending slots 115' being spaced between radially extending slots 118' and passages 119'. Disposed between adjacent slots 118' alternately are the slots 115' and the slots 116' and passageways 117'. The letters A, B and C in FIG. 6B indicate the polymer material which would enter and leave the particular slots if the distribution block of FIG. 6B replaces the distribution block 114 of FIGS. 6 and 6A. Thus employing the embodiment set forth in FIG. 6B the resultant tube would have spirally arranged layers of the sequence . . . ABCB ABCB ABCB . . . . This embodiment is particularly advantageous where the B layer either promotes or prevents adhesion of the A and C layers, whichever phenomenon is desired.

In FIG. 6C there is illustrated an alternative arrangement of a distribution ring 114". The view in FIG. 6C is taken radially outwardly from the center. The distribution block 114" has disposed therein a plurality of radially disposed hollow tubes 121.

FIG. 6D depicts a sectional view of the ring 144''' and its relationship to the annular passageways within the housing wherein polymer A is passed through the tubes 121 and the chamber 122 is provided with polymer B and the chamber 125 is provided with polymer C.

The resultant product designated by the reference numeral 180 is schematically illustrated in FIG. 6E. The product 180 comprises a tube having an outer layer 181 composed of polymer B containing helically oriented filaments 182 of polymer A and an inner layer 183 of polymer C containing helically oriented filaments of polymer A. This configuration is achieved when the die portion 160 and the mandrel 135 are rotated in opposite directions.

FIG. 6F depicts an alternate cross section of a distribution block 114''' wherein radially extending passageways 115''' are commensurate with the width of the annular slot 130 and slots 118''' are substantially narrower. Such an arrangement results in the encapsulation of a polymer B entering the passageway 119''' and being discharged from the slot 118'''.

In FIG. 7 there is illustrated a modification of the apparatus of FIG. 6 generally depicted by the reference numeral 190. The apparatus 190 comprises in cooperative combination a housing generally designated by the reference numeral 191. The housing 191 comprises 3 housing portions, 191a, 191b, and 191c disposed in sealing relationship with each other. The housing 191 defines an internal cavity generally designated by the reference numeral 193 within which is disposed a rotatable mandrel 195. Disposed within the housing 191 is a distribution block 196 identical to the distribution block 114 of FIG. 6. Cavities 197, 198 and 199 adapted to receive polymers A, B and C, respectively, form polymer sources 201, 202 and 203. The distribution block 196 discharges polymeric layers into a generally annular passageway 199 in a manner identical to that of the block 114 of FIG. 6. Within the housing portions 191b and 191c is mounted a rotatable die portion 205 which, in cooperative combination with the mandrel 195, defines the annular passageway 207. A sheeting die generally designated by the reference numeral 210 is in sealing engagement with the housing portion 191c and adapted to receive polymeric material from the passageway 199. The housing 210 defines an internal passageway 212 having a receiving end 213 and a discharge end 214. The mandrel 195 in cooperation with the sheeting die 210 forms the receiving passageway end 213 into a hollow conical configuration permitting streamline flow. The terminal portion of the sheeting die 210 comprises a fixed die lip 216 and an adjustable die lip 217. The die lips 216 and 217 define an extrusion orifice 218.

FIG. 8 depicts a front view of the apparatus of FIG. 7 indicating the relationship between the housing 191 and the sheeting die 210.

In FIG. 8A there is illustrated a schematic exaggerated cross sectional view of a sheet produced by the apparatus of FIGS. 7 and 8. The sheet is designated by the reference numeral 220 and a plurality of layers of polymer 221, 222 and 223 in an elongated spiral configuration are depicted.

In FIG. 9 there is schematically depicted an alternate embodiment of the invention employing feed streams essentially as obtainable from FIG. 6 and the various feed ports of FIGS. 6B, C, D and E. The apparatus of FIG. 9 comprises a housing generally designated by the reference numeral 230 and defining therein a generally annular feed channel 231 adapted to receive a striated or foliated stream such as the embodiments of FIGS. 6B, C, D and E. A rotating external die 232 is disposed within a cavity 233 of the housing 230. The die 232 defines a tapering conical inner surface 234 which defines a passageway 236. The passageway 236 is in communication with the passage 231 and decreases in diameter as the distance is increased from the annular passage 231. The passageway 236 terminates at an external die lip 238 remotely disposed from the annular passageway 231. A rotating mandrel 240 is disposed within the passageway 236. The mandrel 240 defines a generally conical surface 242 disposed in spaced relationship to the surface 234 defining an annular generally conical space 244. An axially arranged passageway 245 is defined by the mandrel 240 and an elongated generally cylindrical object 246 such as a cable, conduit or the like is disposed within the passageway 245. In operation of the embodiment of FIG. 9, striated or layered feed stream from the passageway 231 passes through the generally conical passageway 244 wherein the striations or layers are spirally disposed. The material contacts the elongated object 246 which is withdrawn in the direction of the arrow, thereby providing a multilayer coating thereon. An alternate modification of the apparatus of FIG. 9 is to employ a solid mandrel and extrude a rod having spiral layers of laminations.

FIG. 10 depicts a schematic simplified cross sectional view of an elongated article such as the article 246 having a multilayer spirally laminated coating 247 on the external surface thereof.

In FIG. 11 a fractional end view of an iridescent structure in accordance with the invention generally designated by the reference numeral 250 is depicted. The structure 250 comprises an iridescent film generally designated by the reference numeral 251. The film 251 is comprised of a plurality of layers 253 of a transparent synthetic thermoplastic resinous material which lie between and adhered to a plurality of layers 254 of a transparent synthetic resinous material lying between and bonded to the layers 253. A transparent surface layer 255 is adhered to an adjacent layer 253. The refractive indices of the thermoplastic resinous materials comprising layers 253 and 254 differ by at least about 0.03. A pressure sensitive adhesive layer 257 is disposed in contact with the film 251 remote from the surface 255. The pressure sensitive adhesive layer secures the film to a substrate 258.

In the practice of the method of the present invention, streams of diverse thermoplastic resinous materials are provided from suitable sources such as, for example, the heat plastifying extruder. The streams are then passed to a mechanical manipulating section which serves to rearrange the original streams into a multilayer stream having the number of layers desired in the final product and subsequently the multilayer stream is passed into an extrusion die which is so constructed and arranged that streamline flow is maintained therein and the resultant product is extruded with the laminae substantially parallel to the major surfaces thereof. Any suitable source of heat plastified thermoplastic material may be utilized including extruders, heat plastifying injection machines and any number of diverse thermoplastic materials may be incorporated into such a film. The invention will be described, for the sake of simplicity, with reference to apparatus designed primarily to receive two streams. However, streams in excess of two are also readily employed. A number of diverse stream arranging devices may be employed to increase the number of layers in the original combined stream to that desired in the final product. Such devices are well known to the art and one such device and method is described in U.S. Pat. 3,051,452. The apparatus shown in U.S. Pat. 3,051,452 employs an annular stream diverter which divides and recombines a flowing stream in such a manner that a large number of layers are generated. Such a large number of layers are generated that the material becomes an apparently homogeneous mixture. A device embodying the same principle as described in U.S. Pat. 3,051,453 is so constructed that rather than generating a plurality of concentric layers a number of parallel laminae are produced. U.S. Pat. 3,131,910 describes a mixing apparatus which provides a number of spirally disposed layers within a stream. A mixer operating on a similar principle is disclosed in U.S. Pat. 3,127,152. Another apparatus which is useful to generate layers for the practice of the present invention is shown in U.S. patent application Ser. No. 218,782 for "Counter Rotating Disc Mixer" filed August 22, 1962, now U.S. Pat. 3,176,965. A relatively thorough discussion and theoretical analysis of mixers utilizing rotation of a conduit relative to a stream flowing therethrough and of fluids in an annular channel are set forth in the American Society of Mechanical Engineers, publication No. 62–WA–336, "Continuous Mixing of Very Viscous Fluids in an Annular Channel" by W. J. Schrenk, K. J. Cleereman and T. Alfrey, Jr., and publication No. 63–WA–303, "Mixing of Viscous Fluids Flowing Through a Rotating Tube" by W. J. Schrenk, D. S. Chisholm and T. Alfrey, Jr. The methods and devices of the foregoing references are all directed toward the preparation of homogeneous mixtures by providing a plurality of layers and decreasing the thickness of the layers to the vanishing point. In the practice of the present invention, such devices are used to generate layers of a desired and predetermined thickness and not to produce a homogeneous or a substantially homogeneous mixture. For example, the flow diverters of U.S. Pats. 3,051,452 and 3,051,453 are readily employed in sufficient numbers to produce the desired number of layers, whereas the rotating mixers described in U.S. Pats. 3,127,152 and 3,131,910 and the American Society of Mechanical Engineers Publications are rotated only at a sufficient rate to generate the desired number of layers. If such mechanical working sections are employed to produce a homogeneous mixture of the diverse streams, the benefits and advantages of the present invention are entirely lost. The layered heat plastified thermoplastic resinous stream emerging from the mechanical arranging section may then be fed to an extrusion die which permits the flow of the material therethrough in a streamline manner. Thus, the configuration of the extrusion die may be such as to reduce the thickness and dimension of the layer into the desired region of from about 50 to 10,000 angstroms. The precise degree of reduction in thickness of the layers delivered from the mechanical orienting section, the configuration of the die, the amount of mechanical working of the film after extrusion, are all inter-related factors which will determine the thickness of the layers in the product. Such factors are readily calculable once the constants for any particular portion of the apparatus are known, as described in the ASME publications. Thus, any of the mechanical orienting sections are readily utilized with tubing dies or sheeting dies. The section or baffle of U.S. Pat. 3,051,452 is particularly adapted to provide a tube having a plurality of concentric layers. The baffle of U.S. Pat. 3,051,453 is particularly suited for combination with a sheeting die or slot die wherein the layers are extruded parallel to the slot, resulting in a sheet having laminations parallel to the major surfaces. This section may also be employed with a tubing die and a major portion of the wall of the tube will have a number of laminations equal to about one-half the number of layers in the stream. The rotary type mixers of U.S. Pats. 3,127,152 and 3,131,910 are particularly suited for use with tubing dies wherein a plurality of laminae are spirally arranged. It is necessary in the practice of the present invention that streamline flow be maintained in the apparatus in order that the individual laminae maintain their integrity. Turbulence results in mixing and severe disruption of the laminae and the desired optical characteristics of the product are not obtained. When a tubing die is employed to receive a stream, most advantageously the mandrel of the tubing die is supported in such a manner that a minimum number of spider arms are employed and beneficially, the mandrel may be an integral part of the mechanical orientation section in order that no seal or weld lines are generated in the film or the laminae, or no disruption or displacement of the laminae occurs.

By employing the various modifications of the basic principle of essentially producing a striped sheet, that is, a sheet comprising diverse thermoplastic resinous bodies, in laterally discontinuous relationship to each other, and subjecting the sheet (and including tubes which, for purposes of comprehension of the present invention, may be considered as sheets bent into a cylindrical configuration) to lateral deformation, a wide variety of multilayer products can be made with either a plurality of parallel lamina extending the entire width of the sheet such as is obtained by the embodiment of FIGS. 2 and 3, or sheets having spirally arranged laminae such as that of FIG. 8, encapsulated spirally arranged laminae when using the embodiment of FIG. 6F, or alternatively, the helical laminae which result from the feed port arrangement of FIG. 6D. The laminae produced from FIG. 6D are essentially spirally arranged and come from a viscous deformation of the originally extruded tube or rod-like configuration under the shear force of the rotating mandrel and/or die.

For the preparation of multilayer sheets having maximum geometrical symmetry of the layer, the embodiment of FIGS. 2 and 3 is particularly advantageous in that the degree of distortion from the initial rectangular pattern issuing from the feed ports is minimal and a sheet having generally parallel layers extending from one side to the other obtained. The layers in the film issuing from the die 85 are distorted only by minor deviations in flow pattern which arise from corner effects, skin effects and the like. Thus, the embodiment of FIGS. 2 and 3 is particularly useful for preparing iridescent film having a generally uniform pattern of iridescence over the surface thereof because of the fundamental geometric fidelity maintained by the linear and non-rotating flow patterns. Similarly, when uniform physical properties are desired, it is generally advantageous to utilize as symmetrical and uniform a distribution of the material within the various layers as is possible.

The embodiment of the invention depicted in FIGS. 6 and 6A-6F and FIGS. 7, 8 and 9 inherently produces a product which has a generally spiral configuration of the layers in a cross section thereof. For example, the tube produced by the embodiment of FIG. 6 employing the feed port arrangement of FIG. 6A provides a striated feed into passage 130 wherein there are a plurality of thermoplastic resinous strips in edge to edge relationship extending from the inside to the outside of the passageway. Thus, the interfaces between the diverse plastic materials extend substantially radially as this tube with the radially disposed interfaces enters the area between the rotating die 163 and the rotating mandrel. The interfaces are elongated and disposed in a generally spiral pattern, while still maintaining their relative location at the interface. Thus, a spiral layer depending upon the relative speed of rotation of the mandrel and the die may thus in effect spiral outwardly from the inner surface in a spiral of a few or many turns, depending on the feed rate of the striated tube.

In order to obtain iridescent film having the maximum iridescent appearance and a maximum degree of clarity, it is desirable to encapsulate the individual streams of polymer within a polymer matrix in order that the external surface and internal surface of the polymer stream contacting the rotating surfaces of the die is composed of a homogeneous material and that the individual streams retain their identity. If such encapsulation is not done, the maximum iridescence is not achieved. For example, if the feed port arrangement as depicted in FIG. 6 is employed, there is a tendency toward opalescence or pearlescence at the inner surface of the resulting tube or in the center if the die arrangement of FIG. 7 is employed. Utilizing either the encapsulation or non-encapsulation arrangement of the feedports results in attractive and decorative film having excellent physical characteristics, but for maximum transparency and iridescence, encapsulation of feed streams within a matrix stream is desirable.

By utilizing apparatus in accordance with the present invention, it is possible to prepare thin film from thermoplastic resinous sheet having a large number of distinct and individual layers. When diverse transparent resinous materials are employed to prepare such a film and at least 20 percent of the number of the layers have a thickness ranging from about 0.05 micron to about 5 microns, attractive optical effects are observed and preferably from about 0.05 micron to about 1 micron results in an iridescent film having an extremely attractive and decorative appearance.

To further clarify the requirements for a film showing iridescence, it must have at least two pairs of adjacent discontinuities in refractive index, each member of the pair being separated by a distance of from about 0.05 to about 5 microns, and preferably 0.05 to 1 micron for maximum iridescent effect. That is, the iridescent film shall have within the body of the film two layers having a thickness of about 0.05 micron to about 5 microns, and preferably 0.05 to 1 micron for maximum iridescent effect, and differing from the adjacent portions of the body in refractive index by at least 0.03. Thus, the layers within the film which are responsible for the iridescence are restricted in thickness between the foregoing limits and may be bonded to each other by other layers in the body which are transparent and may be thicker, thinner or equal to the thickness of the layers, giving rise to iridescence. Maximum iridescence is achieved generally when two or more materials are interlayered which have a maximum difference in refractive index and all of the layers lie within the range of 0.05 micron to 5 microns, and preferably 0.05 to 1 micron. Thicker iridescent films, that is, those approaching 10 mils in thickness, may have many layers thicker than 5 microns, while the thinner films having an equal degree of iridescence have layers less than 0.05 micron. Multilayer film having all layers less than about 0.05 micron or having no layers within the range of about 0.05 micron to about 5 microns and preferably 0.05 to 1 micron for maximum iridescent effect do not exhibit the desirable iridescent characteristics.

The visual intensity of such iridescence for a film of a given thickness, for example, a 1 mil film, is increased as the number of thin layers are increased. That is, the greater the number of interfaces between the diverse polymers, the greater the effect of the iridescence. A difference in refractive index between the diverse resins is highly desirable; however, an iridescent effect is obtained when differences of refractive index as low as 0.03 are utilized. Preferably, the refractive indices should differ by at least about 0.1. The greater the difference in value between the refractive indices of adjacent layers, the greater the iridescent character becomes. Depending upon the particular apparatus employed and the geometry of the resultant multilayer film, the iridescence may be substantially uniform over the entire width of the film, or it may be varied from zone to zone in the product. If the geometry of the film is such that the layers are substantially parallel, equal in number and in thickness in all areas of the film, the iridescent effect will be substantially constant and vary primarily with the minor mechanical deviations from perfect geometry of the equipment employed and the uniformity of temperature of the extruded resinous material. Many attractive and interesting optical effects are achieved by employing non-uniform geometry in the film. This may be introduced in a number of ways, for example, by varying the relative feed rates of the extruders so that the thickness of the layers changes as one extruder feeds a greater or lesser amount, transverse bends are generated wherein the iridescent character of the film is substantially constant in the transverse direction of the extruded ribbon, but varies in the machine or longitudinal direction. Variations in the transverse direction are readily obtainable by unbalancing the feed ports to provide layers which taper toward one edge or the other. When employing the embodiment of the apparatus illustrated in FIGS. 7 and 8, the iridescence generally is the greatest in the center portion of the extruded film and reduces somewhat adjacent the edges. However, for practical purposes, normal edge trim in film preparation procedures leaves a finished product which is usually of substantially constant iridescent character in the transverse direction if desired. By carefully controlling the relationship between the extrusion rate and the rotation of the mandrel, the uniformity of iridescence in the machine direction can be varied widely. Exceptionally attractive iridescent film is readily prepared by extrusion of a multilayer film or sheet and subsequent orientation or stretching of the sheet coupled with selective mechanical deformation while in the heat plastified condition will provide a film having an extremely attractive iridescence of short term repetitive nature, depending upon the configuration of the embossing or mechanical deformation. A like result can be achieved by the selective cooling of portions of the heat plastified web as it issues from the die prior to stretching, causing the film to assume a non-uniform geometry. Because of the temperature variations when subsequently oriented, this is readily accomplished by employing a plurality of air jets impinging upon the surface of the extrude. If such air jets are maintained with a constant flow, the product has a striped appearance while a generally spotted or dotted appearance is obtained if the air flow is intermittent. Interesting patterns are obtained by arranging several transverse rolls of air jets across the film and randomly programming the sheets to provide short bursts of cooling air in a random fashion. Beneficially such iridescent films are readily prepared using a trapped bubble process or a tentering technique in order to obtain the desired thinness of the final product.

Employing the embodiment illustrated in FIG. 9 and omitting the conductor 246, a rod or filament is prepared having a spiral laminated configuration. Although the invention has been described utilizing a single opening die such as a sheeting die, a tubing die and the like, multiple filaments of unique and attractive appearance are prepared when the single opening dies are replaced with multiple opening dies or die plates having a plurality of extrusion orifices adapted to extrude parallel filaments. The multilayer stream is readily divided by a multiple orifice die plate to provide a plurality of strands which can be drawn and oriented in the conventional manner. However, in order to achieve iridescence, there must be at least two layers in the filament which have a thickness of from about 0.05 to about 5 microns and preferably 0.05 to 1 micron for maximum iridescent effect, and have a difference in refractive index from the adjacent layer of at least 0.03 and preferably 0.1. Such multilayer iridescent filaments are readily processed into attractive fabrics or admixed with other fibers or filaments to provide attractive iridescent filaments.

Employing the method and apparatus of the present invention, a wide variety of structures may be produced. Particularly beneficial and advantageous are the iridescent films, coatings, rods and filaments which are prepared by employing diverse thermoplastic resinous materials in adjacent layers to provide the transparent body. Beneficially, the method and apparatus also will prepare unique laminar structures of diverse thermoplastic resinous materials which are particularly useful in the packaging art. Multilayer film in accordance with the present invention, be it prepared from transparent or non-transparent materials, provides composite structures having generally improved physical properties including a significant increase in the resistance to delamination or adhesion between adjacent layers than is obtained when simple two or three layer laminates having like thicknesses are prepared. Beneficially, for example, a two or three layer laminate film is a substantially poorer gas barrier in practice than is a multilayer film having the same thickness and same proportion of components. A two or three layer film, on folding or wrinkling, oftentimes loses a relatively large part of its barrier properties, whereas the multilayer films in accordance with the present invention largely retain a major portion of their original barrier properties. Thus, in applications involving gas barrier overwraps, the multilayer films are found superior due to the increased gas barrier property and the increase in adhesion between adjacent layers.

Employing the minor modification of the apparatus of FIGS. 2–5 or the apparatus of FIG. 6, one can readily extrude an iridescent film on an opaque or dissimilar substrate. For example, when the feed arrangement of the apparatus of FIGS. 2–5 is arranged in such a way that one of the polymer sources is adapted to extrude polymer adjacent one of the terminal ends of the feed block 49, for example, by removing all of the passageways designated as present with the exception of the one adjacent the lower portion of FIG. 3, a diverse thermoplastic resinous material may be introduced which does not contribute toward the iridescent film itself, but serves as a substrate. For example, when a black polymer is extruded adjacent one end of the feed block, the resultant product is an iridescent film laminated to a black substrate. Such a film is extremely attractive due to the emphasis of the iridescent character on the dark background. The extrusion rate of the substrate is readily varied to provide a wide variation in the thickness, and further obvious modifications of the feed block may be made in order to increase the proportion of substrate. For example, one-half of the feed block might extrude polymer C adjacent one edge to provide a relatively thick substrate to which an iridescent film is laminated. Alternately, the single passageway c (or multiplicity of passageways c) might be disposed in the central portion of the distribution block in such a way that the substrate is extruded between two iridescent films. Thus, with simple modifications to the feed block, extrusion of a transparent multilayer film is readily achieved wherein the feed block arrangement of FIG. 3 is employed, or alternately by varying the position and location of the discharge of one of the components being fed to the die, the single-sided iridescent opaque films or sheets are readily produced or double-sided opaque iridescent films can be prepared. The choice of the substrate from which to place the iridescent film is primarily one of the particular applications to which the iridescent film is being placed. Thus, black, white or colored substrates are often desirable. Beneficially, for many applications, it is advantageous to coat one side of the iridescent film with a pressure sensitive adhesive which permits ready application to a wide variety of surfaces. Any pressure sensitive adhesive which does not chemically attack and destroy the structure which causes iridescence in the film is satisfactory. The choice of such pressure sensitive adhesives is primarily dependent upon the chemical properties of the iridescent film being used. Due to the laminar configuration of the film, pressure sensitive adhesives which do not attack one component of the iridescent film are found satisfactory. If one layer of the film is attacked by the adhesive and the adjacent layer is not, excellent bonding is achieved and the insensitive layer serves to protect the adjacent layer of sensitive material from the pressure sensitive adhesive. Thus, under relatively unfavorable conditions, only one layer of the iridescent structure is destroyed or distorted. Generally, however, many pressure sensitive adhesives are available which may be applied from an aqueous dispersion and do not effect any of the layers of the iridescent material. Many adhesives or pressure sensitive compositions are known, some of which are described in the following U.S. patents: 2,358,761; 2,395,419; 2,744,041; 2,750,316; 2,783,166; 2,156,380; 2,177,627; 2,319,959 and 2,553,816.

Beneficially, attractive iridescent films are prepared from a wide variety of synthetic resinous thermoplastic materials including the materials hereinafter tabulated with their refractive index in Table 1.

TABLE 1

| Polymer name: | Refractive index |
|---|---|
| Polytetrafluoroethylene | 1.35 |
| FEP (fluorinated ethylene-propylene copolymer) | 1.34 |
| Polyvinylidenefluoride | 1.42 |
| Polychlorotrifluoroethylene | 1.42 |
| Polybutyl acrylate | 1.46 |
| Polyvinyl acetate | 1.47 |
| Ethyl cellulose | 1.47 |
| Polyformaldehyde | 1.48 |
| Polyisobutyl methacrylate | 1.48 |
| Polybutyl methacrylate | 1.48 |
| Polymethyl acrylate | 1.48 |
| Polypropyl methacrylate | 14.8 |
| Polyethyl methacrylate | 1.48 |
| Polymethyl methacrylate | 1.49 |
| Cellulose acetate | 1.49 |
| Cellulose propionate | 1.49 |
| Cellulose acetate-butyrate | 1.49 |
| Cellulose nitrate | 1.49 |
| Polyvinyl butyral | 1.49 |
| Polypropylene | 1.49 |
| Low density polyethylene (branched) | 1.51 |
| Polyisobutylene | 1.51 |
| Natural rubber | 1.52 |
| Perbunan | 1.52 |
| Polybutadiene | 1.52 |
| Nylon (condensation copolymer of hexamethylene-diamine and adipic acid) | 1.53 |
| Polyvinyl chloroacetate | 1.54 |
| Polyvinylchloride | 1.54 |
| Polyethylene (high density linear) | 1.54 |
| A copolymer of 67 parts by weight methyl methacrylate and 33 parts by weight styrene | 1.54 |
| A copolymer of 85 parts by weight vinyl chloride and 15 parts by weight vinylidene chloride | 1.55 |
| Poly-α-methylstyrene | 1.56 |
| A copolymer of 60 parts by weight styrene and 40 parts by weight butadiene | 1.56 |
| Neoprene | 1.56 |
| A copolymer of 70 parts by weight styrene and 30 parts by weight acrylonitrile | 1.57 |
| Polycarbonate resin | 1.59 |
| Polystyrene | 1.60 |
| A copolymer of 85 parts by weight vinylidene chloride and 15 parts by weight vinyl chloride | 1.61 |
| Polydichlorostyrene | 1.62 |

By selecting combinations which have a difference in refractive index of at least 0.3, an iridescent film results. However, for maximum iridescence, beneficially, the difference is about 0.1. When multilayer films are prepared using 3 or more components, iridescence is obtained when at least some of the adjacent layers exhibit the desired difference in refractive index.

Various additives and stabilizers are beneficially utilized. Pigments, stabilizers, dyes, lubricants and other additives may be present in the polymers. However, if maximum iridescence is desired, such additives should be maintained at a level which does not interfere significantly with the transparency of the product.

EXAMPLE 1

Employing an apparatus generally as illustrated in FIGS. 2–5, a two-component film is prepared by utilizing the feed ports A and B to form a biaxially oriented film having about 125 layers and a final thickness of about 0.9 mil. The transparent thermoplastic resinous polymers are 20 parts polystyrene and 80 parts low density polyethylene. The thickness of the polyethylene layers is about 0.27 micron. The thickness of the polystyrene layers is about 0.08 micron. The resultant film shows increased impact strength, has an ultimate elongation about equal to that of polystyrene alone, an ultimate tensile strength about ⅓ that of polystyrene and about 30 percent greater than polyethylene, and a remarkable resistance to the development of gas and water vapor leaks on crumpling. Embossing of the product issuing from the die prior to cooling below the thermoplastic temperature results in a regular variation of the iridesccent character generally following the pattern of the embossing.

EXAMPLE 2

The procedure of Example 1 is followed with the exception that the film is prepared employing 20 weight percent polyethylene and 80 weight percent polystyrene. The polystyrene layers have a thickness of about 0.26 micron. The polyethylene layers have a thickness of about 0.09 micron. The resultant film has a thickness of about 0.85 mil and an ultimate tensile strength of about 60 percent greater than polystyrene alone. The resultant film has an ultimate elongation about ½ that of polystyrene and 1⁄20 that of polyethylene and a water vapor transmission rate about ⅓ that of polystyrene. The resultant film is iridescent, and on embossing, provides a particularly attractive appearance.

EXAMPLE 3

Exmple 1 is repeated with the exception that a film is prepared employing 80 parts by weight of polypropylene (.27 micron thick layers) and 20 parts by weight of polystyrene (0.08 micron thick layers). The ultimate tensile strength of the resultant film is about 60 percent greater than that of polystyrene and about ½ that of polypropylene. The ultimate elongation is about 17 times that of polystyrene and about 1.7 times that of commercially available propylene. The oxygen transmission rate is about ½ that of polystyrene and closely approaches that of polypropylene. Water vapor transmission of a crumpled sample is about less than $\frac{1}{10}$ that of the polystyrene.

EXAMPLE 4

The procedure of Example 1 is repeated with the exception that the film is prepared from 20 parts by weight of polypropylene and 80 parts by weight of polystyrene. The polypropylene layers were about 0.09 micron in thickness and the polystyrene layers about 0.26 micron in thickness. The film is transparent and exhibits high iridescence, is readily embossed, and has an ultimate elongation of about 136 percent which is over 13 times that of polystyrene.

EXAMPLE 5

A two-component film using equal parts of polychlorotrifluoroethylene and polyethylene is prepared in accordance with Example 1 to provide an iridescent, attractive film.

EXAMPLE 6

A two-component film using 75 parts by weight of ethyl cellulose (layer thickness about 0.27 micron) and 25 parts by weight polystyrene (layer thickness about 0.09 micron) is prepared in accordance with Example 1 to provide an iridescent, attractive film.

EXAMPLE 7

A two-component film using 50 parts by weight of ethyl cellulose and 50 parts by weight polyisobutylene (all layers about 0.18 micron in thickness) is prepared in accordance with Example 1 to provide an iridescent, attractive film.

EXAMPLE 8

The procedure of Example 1 is followed with the exception that three polymers are employed to prepare a laminated film having the sequence A, B and C, wherein A is polyvinyl acetate (41 layers, thickness of about 0.5 micron), B is polyethylene (42 layers, thickness about 0.01 micron) and C is polystyrene (42 layers, thickness about 0.107 micron). An iridescent, attractive film having a thickness of about 1 mil is obtained.

EXAMPLE 9

Samples of film prepared in accordance with Examples 1–8 are coated on one side with a synthetic resinous latex or a dispersion of a polymer having 35 parts by weight styrene and 62½ parts by weight of butadiene and 2½ parts by weight of acrylic acid to provide a substantially water-free dry coating having a thickness of about ¾ of a mil. The coated film samples, on being pressed onto various substrates including wood, paper, metal, polystyrene and black phenol formaldehyde molded articles with the styrene butadiene copolymer layer adjacent the article or substrate adhere to provide a decorative finish thereon. Similar beneficial results are achieved when the samples have the form of a tape.

EXAMPLE 10

The procedure of Example 9 is repeated employing a latex containing a copolymer of 80 parts of butadiene and 20 parts of butyl acrylate. Similar beneficial results are obtained.

Repetition of the foregoing experiments wherein film having thicknesses up to about 10 mils is prepared and having layers with thicknesses varying from about 0.1 micron to about 5 microns results in an attractive, iridescent film or sheet.

Repetition of the foregoing experiments utilizing the following tabulated combinations of polymers to provide multilayer film having thicknesses up to about 10 mils, having at least 10 layers, wherein at least 20 percent of the layers have a thickness of from 0.05 to 5 microns produces iridescent film.

TABLE 2

Combinations

Polytetrafluoroethylene with polyvinylidenefluoride
Polytetrafluoroethylene with polychlorotrifluoroethylene
Polytetrafluoroethylene with polybutyl acrylate
Polytetrafluoroethylene with polyvinyl acetate
Polytetrafluoroethylene with ethyl cellulose
Polytetrafluoroethylene with polyformaldehyde
Polytetrafluoroethylene with polyisobutyl methacrylate
Polytetrafluoroethylene with polybutyl methacrylate
Polytetrafluoroethylene with polymethyl acrylate
Polytetrafluoroethylene with polypropyl methacrylate
Polytetrafluoroethylene with polyethyl methacrylate
Polytetrafluoroethylene with polymethyl methacrylate
Polytetrafluoroethylene with cellulose acetate
Polytetrafluoroethylene with cellulose propionate
Polytetrafluoroethylene with cellulose acetate-butyrate
Polytetrafluoroethylene with cellulose nitrate
Polytetrafluoroethylene with polyvinyl butyral
Polytetrafluoroethylene with polypropylene
Polytetrafluoroethylene with low density polyethylene (branched)
Polytetrafluoroethylene with polyisobutylene
Polytetrafluoroethylene with natural rubber
Polytetrafluoroethylene with perbunan
Polytetrafluoroethylene with polybutadiene
Polytetrafluoroethylene with nylon (condensation copolymer of hexamethylene-diamine and adipic acid)
Polytetrafluoroethylene with polyvinyl chloroacetate
Polytetrafluoroethylene with polyvinylchloride
Polytetrafluoroethylene with polyethylene (high density linear)
Polytetrafluoroethylene with a copolymer of 67 parts by weight methyl methacrylate and 33 parts by weight styrene
Polytetrafluoroethylene with a copolymer of 85 parts by weight vinyl chloride and 15 parts by weight vinylidene chloride
Polytetrafluoroethylene with poly-α-methylstyrene
Polytetrafluoroethylene with a copolymer of 60 parts by weight styrene and 40 parts by weight butadiene
Polytetrafluoroethylene with neoprene
Polytetrafluoroethylene with a copolymer of 70 parts by weight styrene and 30 parts by weight acrylonitrile
Polytetrafluoroethylene with polycarbonate resin
Polytetrafluoroethylene with polystyrene
Polytetrafluoroethylene with a copolymer of 85 parts by weight vinylidene chloride and 15 parts by weight vinyl chloride
Polytetrafluoroethylene with polydichlorostyrene
FEP (fluorinated ethylene-propylene copolymer) with polyvinylidene fluoride
FEP (fluorinated ethylene-propylene copolymer) with polychlorotrifluoroethylene
FEP (fluorinated ethylene-propylene copolymer) with polybutyl acrylate
FEP (fluorinated ethylene-propylene copolymer) with polyvinyl acetate
FEP (fluorinated ethylene-propylene copolymer) with ethyl cellulose
FEP (fluorinated ethylene-propylene copolymer) with polyformaldehyde FEP (fluorinated ethylene-propylene copolymer) with polyisobutyl methacrylate
FEP (fluorinated ethylene-propylene copolymer) with polybutyl methacrylate
FEP (fluorinated ethylene-propylene copolymer) with polymethyl acrylate
FEP (fluorinated ethylene-propylene copolymer) with polypropyl methacrylate
FEP (fluorinated ethylene-propylene copolymer) with polyethyl methacrylate
FEP (fluorinated ethylene-propylene copolymer) with cellulose acetate
FEP (fluorinated ethylene-propylene copolymer) with cellulose propionate
FEP (fluorinated ethylene-propylene copolymer) with cellulose acetate-butyrate
FEP (fluorinated ethylene-propylene copolymer) with cellulose nitrate
FEP (fluorinated ethylene-propylene copolymer) with polyvinyl butyral
FEP (fluorinated ethylene-propylene copolymer) with polypropylene
FEP (fluorinated ethylene-propylene copolymer) with low density polyethylene (branched)
FEP (fluorinated ethylene-propylene copolymer) with polyisobutylene
FEP (fluorinated ethylene-propylene copolymer) with natural rubber
FEP (fluorinated ethylene-propylene copolymer) with perbunan
FEP (fluorinated ethylene-propylene copolymer) with polybutadiene
FEP (fluorinated ethylene-propylene copolymer) with nylon (condensation copolymer of hexamethylene-diamine and adipic acid)
FEP (fluorinated ethylene-propylene copolymer) with polyvinyl chloroacetate
FEP (fluorinated ethylene-propylene copolymer) with polyvinylchloride
FEP (fluorinated ethylene-propylene copolymer) with polyethylene (high density linear)
FEP (fluorinated ethylene-propylene copolymer) with a copolymer of 67 parts by weight methyl methacrylate and 33 parts by weight styrene
FEP (fluorinated ethylene-propylene copolymer) with a copolymer of 85 parts by weight vinyl chloride and 15 parts by weight vinylidene chloride.
FEP (fluorinated ethylene-propylene copolymer) with poly-α-methylstyrene
FEP (fluorinated ethylene-propylene copolymer) with a copolymer of 60 parts by weight styrene and 40 parts by weight butadiene
FEP (fluorinated ethylene-propylene copolymer) with neoprene
FEP (fluorinated ethylene-propylene copolymer) with a copolymer of 70 parts by weight styrene and 30 parts by weight acrylonitrile
FEP (fluorinated ethylene-propylene copolymer) with polycarbonate resin
FEP (fluorinated ethylene-propylene copolymer) with polystyrene
FEP (fluorinated ethylene-propylene copolymer) with a copolymer of 85 parts by weight vinylidene chloride and 15 parts by weight vinyl chloride
FEP (fluorinated ethylene-propylene copolymer) with polydichlorostyrene
Polyvinylidenefluoride with polybutyl acrylate
Polyvinylidene fluoride with polyvinyl acetate
Polyvinylidenefluoride with ethyl cellulose
Polyvinylidenefluoride with polyformaldehyde
Polyvinylidenefluoride with polyethyl methacrylate
Polyvinylidenefluoride with polybutyl methacrylate
Polyvinylidenefluoride with polymethyl acrylate
Polyvinylidenefluoride with polypropyl methacrylate
Polyvinylidenefluoride with polyethyl methacrylate
Polyvinylidenefluoride with polymethyl methacrylate
Polyvinylidenefluoride with cellulose acetate
Polyvinylidenefluoride with cellulose propionate
Polyvinylidenefluoride with cellulose acetate-butyrate
Polyvinylidenefluoride with cellulose nitrate
Polyvinylidenefluoride with polyvinyl butyral
Polyvinylidenefluoride with polypropylene
Polyvinylidenefluoride with low density polyethylene (branched)
Polyvinylidenefluoride with polyisobutylene
Polyvinylidenefluoride with natural rubber
Polyvinylidenefluoride with perbunan
Polyvinylidenefluoride with polybutadiene
Polyvinylidenefluoride with nylon (condensation copolymer of hexamethylene-diamine and adipic acid)
Polyvinylidenefluoride with polyvinyl chloroacetate
Polyvinylidenefluoride with polyvinylchloride
Polyvinylidenefluoride with polyethylene (high density linear)
Polyvinylidenefluoride with a copolymer of 67 parts by weight methyl methacrylate and 33 parts by weight styrene
Polyvinylidenefluoride with a copolymer of 85 parts by weight vinyl chloride and 15 parts by weight vinylidene chloride
Polyvinylidenefluoride with poly-α-methylstyrene
Polyvinylidenefluoride with a copolymer of 60 parts by weight styrene and 40 parts by weight butadiene
Polyvinylidenefluoride with neoprene
Polyvinylidenefluoride with a copolymer of 70 parts by weight styrene and 30 parts by weight acrylonitrile
Polyvinylidenefluoride with polycarbonate resin
Polyvinylidenefluoride with polystyrene
Polyvinylidenefluoride with a copolymer of 85 parts by weight vinylidene chloride and 15 parts by weight vinyl chloride
Polyvinylidenefluoride with polydichlorostyrene
Polychlorotrifluoroethylene with polybutyl acrylate
Polychlorotrifluoroethylene with polyvinyl acetate
Polychlorotrifluoroethylene with ethyl cellulose
Polychlorotrifluoroethylene with polyformaldehyde
Polychlorotrifluoroethylene with polyisobutyl methacrylate
Polychlorotrifluoroethylene with polybutyl methacrylate
Polychlorotrifluoroethylene with polymethyl acrylate
Polychlorotrifluoroethylene with polypropyl methacrylate
Polychlorotrifluoroethylene with polyethyl methacrylate
Polychlorotrifluoroethylene with polymethyl methacrylate
Polychlorotrifluoroethylene with cellulose acetate
Polychlorotrifluoroethylene with cellulose propionate
Polychlorotrifluoroethylene with cellulose acetate-butyrate
Polychlorotrifluoroethylene with cellulose nitrate
Polychlorotrifluoroethylene with polyvinyl butyral
Polychlorotrifluoroethylene with polypropylene
Polychlorotrifluoroethylene with low density polyethylene (branched)
Polychlorotrifluoroethylene with polyisobutylene
Polychlorotrifluoroethylene with natural rubber
Polychlorotrifluoroethylene with perbunan
Polychlorotrifluoroethylene with polybutadiene
Polychlorotrifluoroethylene with nylon (condensation copolymer of hexamethylene-diamine and adipic acid)
Polychlorotrifluoroethylene with polyvinyl chloroacetate
Polychlorotrifluoroethylene with polyvinylchloride
Polychlorotrifluoroethylene with polyethylene (high density linear)
Polychlorotrifluoroethylene with a copolymer of 67 parts by weight methyl methacrylate and 33 parts by weight styrene
Polychlorotrifluoroethylene with a copolymer of 85 parts by weight vinyl chloride and 15 parts by weight vinylidene chloride
Polychlorotrifluoroethylene with poly-α-methylstyrene Polychlorotrifluoroethylene with a copolymer of 60 parts by weight styrene and 40 parts by weight butadiene
Polychlorotrifluoroethylene with neoprene
Polychlorotrifluoroethylene with a copolymer of 70 parts by weight styrene and 30 parts by weight acrylonitrile
Polychlorotrifluoroethylene with polycarbonate resin
Polychlorotrifluoroethylene with polystyrene
Polychlorotrifluorethylene with a copolymer of 85 parts by weight vinylidene chloride and 15 parts by weight vinyl chloride
Polychlorotrifluoroethylene with polydichlorostyrene
Polybutyl acrylate with polymethyl methacrylate
Polybutyl acrylate with cellulose acetate
Polybutyl acrylate with cellulose propionate
Polybutyl acrylate with cellulose acetate-butyrate
Polybutyl acrylate with cellulose nitrate
Polybutyl acrylate with polyvinyl butyral
Polybutyl acrylate with polypropylene
Polybutyl acrylate with low density polyethylene (branched)
Polybutyl acrylate with polyisobutylene
Polybutyl acrylate with natural rubber
Polybutyl acrylate with perbunan
Polybutyl acrylate with polybutadiene
Polybutyl acrylate with nylon (condensation copolymer of hexamethylene-diamine and adipic acid)
Polybutyl acrylate with polyvinyl chloroacetate
Polybutyl acrylate with polyvinylchloride
Polybutyl acrylate with polyethylene (high density linear)
Polybutyl acrylate with a copolymer of 67 parts by weight methyl methacrylate and 33 parts by weight styrene
Polybutyl acrylate with a copolymer of 85 parts by weight vinyl chloride and 15 parts by weight vinylidene chloride
Polybutyl acrylate with poly-α-methylstyrene
Polybutyl acrylate with a copolymer of 60 parts by weight styrene and 40 parts by weight butadiene
Polybutyl acrylate with neoprene
Polybutyl acrylate with a copolymer of 70 parts by weight styrene and 30 parts by weight acrylonitrile
Polybutyl acrylate with polycarbonate resin
Polybutyl acrylate with polystyrene
Polybutyl acrylate with a copolymer of 85 parts by weight vinylidene chloride and 15 parts by weight vinyl chloride
Polybutyl acrylate with polydichlorostyrene
Polyvinyl acetate with low density polyethylene (branched)
Polyvinyl acetate with polyisobutylene
Polyvinyl acetate with natural rubber
Polyvinyl acetate with perbunan
Polyvinyl acetate with polybutadiene
Polyvinyl acetate with nylon (condensation copolymer of hexamethylene-diamine and adipic acid)
Polyvinyl acetate with polyvinyl chloroacetate
Polyvinyl acetate with polyvinylchloride
Polyvinyl acetate with polyethylene (high density linear)
Polyvinyl acetate with a copolymer of 67 parts by weight methyl methacrylate and 33 parts by weight styrene
Polyvinyl acetate with a copolymer of 85 parts by weight vinyl chloride and 15 parts by weight vinylidene chloride
Polyvinyl acetate with poly-α-methylstyrene
Polyvinyl acetate with a copolymer of 60 parts by weight styrene and 40 parts by weight butadiene
Polyvinyl acetate with neoprene
Polyvinyl acetate with a copolymer of 70 parts by weight styrene and 30 parts by weight acrylonitrile
Polyvinyl acetate with polycarbonate resin
Polyvinyl acetate with polystyrene
Polyvinyl acetate with a copolymer of 85 parts by weight vinylidene chloride and 15 parts by weight vinyl chloride
Polyvinyl acetate with polydichlorostyrene
Ethyl cellulose with low density polyethylene (branched)
Ethyl cellulose with polyisobutylene
Ethyl cellulose with natural rubber
Ethyl cellulose with perbunan
Ethyl cellulose with polybutadiene
Ethyl cellulose with nylon (condensation copolymer of hexamethylene-diamine and adipic acid)
Ethyl cellulose with polyvinyl chloroacetate
Ethyl cellulose with polyvinylchloride
Ethyl celulose with poyethylene (high density linear)
Ethyl cellulose with a copolymer of 67 parts by weight methyl methacrylate and 33 parts by weight styrene
Ethyl cellulose with a copolymer of 85 parts by weight vinyl chloride and 15 parts by weight vinylidene chloride
Ethyl cellulose with poly-α-methylstyrene
Ethyl cellulose with a copolymer of 60 parts by weight styrene and 40 parts by weight butadiene
Ethyl cellulose with neoprene
Ethyl cellulose with a copolymer of 70 parts by weight styrene and 30 parts by weight acrylonitrile
Ethyl cellulose with polycarbonate resin
Ethyl cellulose with polystyrene
Ethyl cellulose with a copolymer of 85 parts by weight vinylidene chloride and 15 parts by weight vinyl chloride
Ethyl cellulose with polydichlorostyrene
Polyformaldehyde with loy density polyethylene (branched)
Polyformaldehyde with polyisobutylene
Polyformaldehyde with natural rubber
Polyformaldehyde with perbunan
Polyformaldehyde with polybutadiene
Polyformaldehyde with nylon (condensation copolymer of hexamethylene-diamine and adipic acid)
Polyformaldehyde with polyvinyl chloroacetate
Polyformaldehyde with polyvinylchloride
Polyformaldehyde with polyethylene (high density linear)
Polyformaldehyde with a copolymer of 67 parts by weight methyl methacrylate and 33 parts by weight styrene
Polyformaldehyde with a copolymer of 85 parts by weight vinyl chloride and 15 parts by weight vinylidene chloride
Polyformaldehyde with poly-α-methylstyrene
Polyformaldehyde with a copolymer of 60 parts by weight styrene and 40 parts by weight butadiene
Polyformaldehyde with neoprene
Polyformaldehyde with a copolymer of 70 parts by weight styrene and 30 parts by weight acrylonitrile
Polyformaldehyde with polycarbonate resin
Polyformaldehyde with polystyrene
Polyformaldehyde with a copolymer of 85 parts by weight vinylidene chloride and 15 parts by weight vinyl chloride
Polyformaldehyde with polydichlorostyrene
Polyisobutyl methacrylate with low density polyethylene (branched)
Polyisobutyl methacrylate with polyisobutylene
Polyisobutyl methacrylate with natural rubber
Polyisobutyl methacrylate with perbunan
Polyisobutyl methacrylate with polybutadiene
Polyisobutyl methacrylate with nylon (condensation copolymer of hexamethylene-diamine and adipic acid)
Polyisobutyl methacrylate with polyvinyl chloroacetate
Polyisobutyl methanrylate with polyvinylchloride
Polisobutyl methacrylate with polyethylene (high density linear)
Polyisobutyl methacrylate with a copolymer of 67 parts by weight methyl methacrylate and 33 parts by weight styrene
Polyisobutyl methacrylate with a copolymer of 85 parts by weight vinyl chloride and 15 parts by weight vinylidene chloride
Polyisobutyl methacrylate with poly-α-methylstyrene
Polyisobutyl methacrylate with a copolymer of 60 parts by weight styrene and 40 parts by weight butadiene
Polyisobutyl metharcylate with neoprene
Polyisobutyl methacrylate with a copolymer of 70 parts by weight styrene and 30 parts by weight acrylonitrile Polyisobutyl methacrylate with polycarbonate resin
Polyisobutyl methacrylate with polystyrene
Polyisobutyl methacrylate with a copolymer of 85 parts by weight vinylidene chloride and 15 parts by weight vinyl chloride
Polyisobutyl methacrylate with polydichlorostyrene
Polybutyl methacrylate with low density polyethylene (branched)
Polybutyl methacrylate with polyisobutylene
Polybutyl methacrylate with natural rubber
Polybutyl methacrylate with perbunan
Polybutyl methacrylate with polybutadiene
Polybutyl methacrylate with nylon (condensation copolymer of hexamethylene-diamine and adipic acid)
Polybutyl methacrylate with polyvinyl chloroacetate
Polybutyl methacrylate with polyvinylchloride
Polybutyl methacrylate with polyethylene (high density linear)
Polybutyl methacrylate with a copolymer of 67 parts by weight methyl methacrylate and 33 parts by weight styrene
Polybutyl methacrylate with a copolymer of 85 parts by weight vinyl chloride and 15 parts by weight vinylidene chloride
Polybutyl methacrylate with poly-α-methylstyrene
Polybutyl methacrylate with a copolymer of 60 parts by weight styrene and 40 parts by weight butadiene
Polybutyl methacrylate with neoprene
Polybutyl methacrylate with a copolymer of 70 parts by weight styrene and 30 parts by weight acrylonitrile
Polybutyl methacrylate with polycarbonate resin
Polybutyl methacrylate with polystyrene
Polybutyl methacrylate with a copolymer of 85 parts by weight vinylidene chloride and 15 parts by weight vinyl chloride
Polybutyl methacrylate with polydichlorostyrene
Polymethyl acrylate with low density polyethylene (branched)
Polymethyl acrylate with polyisobutylene
Polymethyl acrylate with natural rubber
Polymethyl acrylate with perbunan
Polymethyl acrylate with polybutadiene
Polymethyl acrylate with nylon (condensation copolymer of hexamethylene-diamine and adipic acid)
Polymethyl acrylate with chloroacetate
Polymethyl acrylate with polyvinylchloride
Polymethyl acrylate with polyethylene (high density linear)
Polymethyl acrylate with a copolymer of 67 parts by weight methyl methacrylate and 33 parts by weight styrene
Polymethyl acrylate with a copolymer of 85 parts by weight vinyl chloride and 15 parts by weight vinylidene chloride
Polymethyl acrylate with poly-α-methylstyrene
Polymethyl acrylate with a copolymer of 60 parts by weight styrene and 40 parts by weight butadiene
Polymethyl acrylate with neoprene
Polymethyl acrylate with a copolymer of 70 parts by weight styrene and 30 parts by weight acrylonitrile
Polymethyl acrylate with polycarbonate resin
Polymethyl acrylate with polystyrene
Polymethyl acrylate with a copolymer of 85 parts by weight vinylidene chloride and 15 parts by weight vinyl chloride
Polymethyl acrylate with polydichlorostyrene
Polypropyl methacrylate with low density polyethlene (branched)
Polpropyl methacrylate with polyisobutylene
Polpropyl methacrylate with natural rubber
Polypropyl methacrylate with perbunan
Polypropyl methacrylate with polybutadiene
Polypropyl methacrylate with nylon (condensation copolymer of hexamethylene-diamine and adipic acid)
Polypropyl methacrylate with polyvinyl chloroacetate
Polypropyl methacrylate with polyvinylchloride
Polypropyl methacrylate with polyethylene (high density linear)
Polypropyl methacrylate with a copolymer of 67 parts by weight methyl methacrylate and 33 parts by weight styrene
Polypropyl methacrylate with a copolymer of 85 parts by weight vinyl chloride and 15 parts by weight vinylidene chloride
Polypropyl methacrylate with poly-α-methylstyrene
Polypropyl methacrylate with a copolymer of 60 parts by weight styrene and 40 parts by weight butadiene
Polypropyl methacrylate with neoprene
Polypropyl methacrylate with a copolymer of 70 parts by weight styrene and 30 parts by weight of acrylonitrile
Polypropyl methacrylate with polycarbonate resin
Polypropyl methacrylate with polystyrene
Polypropyl methacrylate with a copolymer of 85 parts by weight vinylidene chloride and 15 parts by weight vinyl chloride
Polypropyl methacrylate with polydichlorostyrene
Polyethyl methacrylate with low density polyethylene (branched)
Polyethyl methacrylate with polyisobutylene
Polyethyl methacrylate with natural rubber
Polyethyl methacrylate with perbunan
Polyethyl methacrylate with polybutadiene
Polyethyl methacrylate with nylon (condensation copolymer of hexamethylene-diamine and adipic acid)
Polyethyl methacrylate with polyvinyl chloroacetate
Polyethyl methacrylate with polyvinylchloride
Polyethyl methacrylate with polyethylene (high density linear)
Polyethyl methacrylate with a copolymer of 67 parts by weight methyl methacrylate and 33 parts by weight styrene
Polyethyl methacrylate with a copolymer of 85 parts by weight vinyl chloride and 15 parts by weight vinylidene chloride
Polyethyl methacrylate with poly-α-methylstyrene
Polyethyl methacrylate with a copolymer of 60 parts by weight styrene and 40 parts by weight butadiene
Polyethyl methacrylate with neoprene
Polyethyl methacrylate with a copolymer of 70 parts by weight styrene and 30 parts by weight acrylonitrile
Polyethyl methacrylate with polycarbonate resin
Polyethyl methacrylate with polystyrene
Polyethyl methacrylate with a copolymer of 85 parts by weight vinylidene chloride and 15 parts by weight vinyl chloride
Polyethyl methacrylate with polydichlorostyrene
Polymethyl methacrylate with natural rubber
Polymethyl methacrylate with perbunan
Polymethyl methacrylate with polybutadiene
Polymethyl methacrylate with nylon (condensation copolymer of hexamethylene-diamine and adipic acid)
Polymethyl methacrylate with polyvinyl chloroacetate
Polymethyl methacrylate with polyvinylchloride
Polymethyl methacrylate with polyethylene (high density linear)
Polymethyl methacrylate with a copolymer of 67 parts by weight methyl methacrylate and 33 parts by weight styrene
Polymethyl methacrylate with a copolymer of 85 parts by weight vinyl chloride and 15 parts by weight vinylidene chloride
Polymethyl methacrylate with poly-α-methylstyrene
Polymethyl methacrylate with a copolymer of 60 parts by weight styrene and 40 parts by weight butadiene
Polymethyl methacrylate with neoprene
Polymethyl methacrylate with a copolymer of 70 parts by weight styrene and 30 parts by weight of acrylonitrile
Polymethyl methacrylate with polycarbonate resin
Polymethyl methacrylate with polystyrene
Polymethyl methacrylate with a copolymer of 85 parts by weight vinylidene chloride and 15 parts by weight vinyl chloride
Polymethyl methacrylate with polydichlorostyrene
Cellulose acetate with natural rubber
Cellulose acetate with perbunan
Cellulose acetate with polybutadiene
Cellulose acetate with nylon (condensation copolymer of hexamethylene-diamine and adipic acid)
Cellulose acetate with polyvinyl chloroacetate
Cellulose acetate with polyvinylchloride
Cellulose acetate with polyethylene (high density linear)
Cellulose acetate with a copolymer of 67 parts by weight methyl methacrylate and 33 parts by weight styrene
Cellulose acetate with a copolymer of 85 parts by weight vinyl chloride and 15 parts by weight vinylidene chloride
Cellulose acetate with poly-α-methylstyrene
Cellulose acetate with a copolymer of 60 parts by weight styrene and 40 parts by weight butadiene
Cellulose acetate with neoprene
Cellulose acetate with a copolymer of 70 parts by weight styrene and 30 parts by weight acrylonitrile
Cellulose acetate with polycarbonate resin
Cellulose acetate with polystyrene
Cellulose acetate with a copolymer of 85 parts by weight vinylidene chloride and 15 parts by weight vinyl chloride
Cellulose acetate with polydichlorostyrene
Cellulose propionate with natural rubber
Cellulose propionate with perbunan
Cellulose propionate with polybutadiene
Cellulose propionate with nylon (condensation copolymer of hexamethylene-diamine and adipic acid)
Cellulose propionate with polyvinyl chloroacetate
Cellulose propionate with polyvinylchloride
Cellulose propionate with polyethylene (high density linear)
Cellulose propionate with a copolymer of 67 parts by weight methyl methacrylate and 33 parts by weight styrene
Cellulose propionate with a copolymer of 85 parts by weight vinyl chloride and 15 parts by weight vinylidene chloride
Cellulose propionate with poly-α-methylstyrene
Cellulose propionate with a copolymer of 60 parts by weight styrene and 40 parts by weight butadiene
Cellulose propionate with neoprene
Cellulose propionate with a copolymer of 70 parts by weight styrene and 30 parts by weight acrylonitrile
Cellulose propionate with polycarbonate resin
Cellulose propionate with polystyrene
Cellulose propionate with a copolymer of 85 parts by weight vinylidene chloride and 15 parts by weight vinyl chloride
Cellulose propionate with polydichlorostyrene
Cellulose acetate-butyrate with natural rubber
Cellulose acetate-butyrate with perbunan
Cellulose acteate-butyrate with polybutadiene
Cellulose acetate-butyrate with nylon (condensation copolymer of hexamethylene-diamine and adipic acid)
Cellulose acetate-butyrate with polyvinyl chloroacetate
Cellulose acetate-butyrate with polyvinylchloride
Cellulose acetate-butyrate with polyethylene (high density linear)
Cellulose acetate-butyrate with a copolymer of 67 parts by weight methyl methacrylate and 33 parts by weight styrene
Cellulose acetate-butyrate with a copolymer of 85 parts by weight vinyl chloride and 15 parts by weight vinylidene chloride
Cellulose acetate-butyrate with a poly-α-methylstyrene
Cellulose acetate-butyrate with a copolymer of 60 parts by weight styrene and 40 parts by weight butadiene
Cellulose acetate-butyrate with neoprene
Cellulose acetate-butyrate with a copolymer of 70 parts by weight styrene and 30 parts by weight acrylonitrile
Cellulose acetate-butyrate with polycarbonate resin
Cellulose acetate-butyrate with polystyrene
Cellulose acetate-butyrate with a copolymer of 85 parts by weight vinylidene chloride and 15 parts by weight vinyl chloride
Cellulose acetate-butyrate with polydichlorostyrene
Cellulose nitrate with natural rubber
Cellulose nitrate with perbunan
Cellulose nitrate with polybutadiene
Cellulose nitrate with nylon (condensation copolymer of hexamethylene-diamine and adipic acid)
Cellulose nitrate with polyvinyl chloroacetate
Cellulose nitrate with polyvinylchloride
Cellulose nitrate with polyethylene (high density linear)
Cellulose nitrate with a copolymer of 67 parts by weight methyl methacrylate and 33 parts by weight styrene
Cellulose nitrate with a copolymer of 85 parts by weight vinyl chloride and 15 parts by weight vinylidene chloride
Cellulose nitrate with poly-α-methylstyrene
Cellulose nitrate with a copolymer of 60 parts by weight styrene and 40 parts by weight butadiene
Cellulose nitrate with neoprene
Cellulose nitrate with a copolymer of 70 parts by weight styrene and 30 parts by weight acrylonitrile
Cellulose nitrate with polycarbonate resin
Cellulose nitrate with polystyrene
Cellulose nitrate with a copolymer of 85 parts by weight vinylidene chloride and 15 parts by weight vinyl chloride
Cellulose nitrate with polydichlorostyrene
Polyvinyl butyral with natural rubber
Polyvinyl butyral with perbunan
Polyvinyl butyrla with polybutadiene
Polyvinyl butyral with nylon (condensation copolymer of hexamethylene-diamine and adipic acid)
Polyvinyl butyral with polyvinyl chloroacetate
Polyvinyl butyral with polyvinylchloride
Polyvinyl butyral with polyethylene (high density linear)
Polyvinyl butyral with a copolymer of 67 parts by weight methyl methacrylate and 33 parts by weight styrene
Polyvinyl butyral with a copolymer of 85 parts by weight vinyl chloride and 15 parts by weight vinylidene chloride
Polyvinyl butyral with poly-α-methylstyrene
Polyvinyl butyral with a copolymer of 60 parts by weight styrene and 40 parts by weight butadiene
Polyvinyl butyral with neoprene
Polyvinyl butyral with a copolymer of 70 parts by weight styrene and 30 parts by weight acrylonitrile
Polyvinyl butyral with polycarbonate resin
Polyvinyl butyral with polystyrene
Polyvinyl butyral with a copolymer of 85 parts by weight vinylidene chloride and 15 parts by weight vinyl chloride
Polyvinyl butyral with polydichlorostyrene
Polypropylene with natural rubber
Polypropylene with perbunan
Polypropylene with polybutadiene
Polypropylene with nylon (condensation copolymer of hexamethylene-diamine and adipic acid)
Polypropylene with polyvinyl chloroacetate
Polypropylene with polyvinylchloride
Polypropylene with polyethylene (high density linear)
Polypropylene with a copolymer of 67 parts by weight methyl methacrylate and 33 parts by weight styrene
Polypropylene with a copolymer of 85 parts by weight vinyl chloride and 15 parts by weight vinylidene chloride
Polypropylene with poly-α-methylstyrene
Polypropylene with a copolymer of 60 parts by weight styrene and 40 parts by weight butadiene
Polypropylene with neoprene Polypropylene with a copolymer of 70 parts by weight styrene and 30 parts by weight acrylonitrile
Polypropylene with polycarbonate resin
Polypropylene with polystyrene
Polypropylene with a copolymer of 85 parts by weight vinylidene chloride and 15 parts by weight vinyl chloride
Polypropylene with polydichlorostyrene
Low density polyethylene (branched) with polyvinyl chloroacetate
Low density polyethylene (branched) with polyvinylchloride
Low density polyethylene (branched) with polyethylene (high density linear)
Low density polyethylene (branched) with a copolymer of 67 parts by weight methyl methacrylate and 33 parts by weight styrene
Low density polyethylene (branched) with a copolymer of 85 parts by weight vinyl chloride and 15 parts by weight vinylidene chloride
Low density polyethylene (branched) with poly-α-methylstyrene
Low density polyethylene (branched) with a copolymer of 60 parts by weight styrene and 40 parts by weight butadiene
Low density polyethylene (branched) with neoprene
Low density polyethylene (branched) with a copolymer of 70 parts by weight styrene and 30 parts by weight acrylonitrile
Low density polyethylene (branched) with polycarbonate resin
Low density polyethylene (branched) with polystyrene
Low density polyethylene (branched) with a copolymer of 85 parts by weight vinylidene chloride and 15 parts by weight vinyl chloride
Low density polyethylene (branched) with polydichlorostyrene
Polyisobutylene with polyvinyl chloroacetate
Polyisobutylene with polyvinylchloride
Polyisobutylene with polyethylene (high density linear)
Polyisobutylene with a copolymer of 67 parts by weight methyl methacrylate and 33 parts by weight styrene
Polyisobutylene with a copolymer of 85 parts by weight vinyl chloride and 15 parts by weight vinylidene chloride
Polyisobutylene with poly-α-methylstyrene
Polyisobutylene with a copolymer of 60 parts by weight styrene and 40 parts by weight butadiene
Polyisobutylene with neoprene
Polyisobutylene with a copolymer of 70 parts by weight styrene and 30 parts by weight acrylonitrile
Polyisobutylene with polycarbonate resin
Polyisobutylene with polystyrene
Polyisobutylene with a copolymer of 85 parts by weight vinylidene chloride and 15 parts by weight vinyl chloride
Polyisobutylene with polydichlorostyrene
Natural rubber with a copolymer of 85 parts by weight vinyl chloride and 15 parts by weight vinylidene chloride
Natural rubber with poly-α-methylstyrene
Natural rubber with a copolymer of 60 parts by weight styrene and 40 parts by weight butadiene
Natural rubber with neoprene
Natural rubber with a copolymer of 70 parts by weight styrene and 30 parts by weight acrylonitrile
Natural rubber with polycarbonate resin
Natural rubber with polystyrene
Natural rubber with a copolymer of 85 parts by weight vinylidene chloride and 15 parts by weight vinyl chloride
Natural rubber with polydichlorostyrene
Perbunan with a copolymer of 85 parts by weight vinyl chloride and 15 parts by weight vinylidene chloride
Perbunan with poly-α-methylstyrene
Perbunan with a copolymer of 60 parts by weight styrene and 40 parts by weight butadiene
Perbunan with neoprene
Perbunan with a copolymer of 70 parts by weight styrene and 30 parts by weight acrylonitrile
Perbunan with polycarbonate resin
Perbunan with polystyrene
Perbunan with a copolymer of 85 parts by weight vinylidene chloride and 15 parts by weight vinyl chloride
Perbunan with polydichlorostyrene
Polybutadiene with a copolymer of 85 parts by weight vinyl chloride and 15 parts by weight vinylidene chloride
Polybutadiene with poly-α-methylstyrene
Polybutadiene with a copolymer of 60 parts by weight styrene and 40 parts by weight butadiene
Polybutadiene with neoprene
Polybutadiene with a copolymer of 70 parts by weight styrene and 30 parts by weight acrylonitrile
Polybutadiene with polycarbonate resin
Polybutadiene with polystyrene
Polybutadiene with a copolymer of 85 parts by weight vinylidene chloride and 15 parts by weight vinyl chloride
Polybutadiene with polydichlorostyrene
Nylon (condensation copolymer of hexamethylene-diamine and adipic acid) with poly-α-methylstyrene
Nylon (condensation copolymer of hexamethylene-diamine and adipic acid) with a copolymer of 60 parts by weight styrene and 40 parts by weight butadiene
Nylon (condensation copolymer of hexamethylene-diamine and adipic acid) with neoprene
Nylon (condensation copolymer of hexamethylene-diamine and adipic acid) with a copolymer of 70 parts by weight styrene and 30 parts by weight acrylonitrile
Nylon (condensation copolymer of hexamethylene-diamine and adipic acid) with polycarbonate resin
Nylon (condensation copolymer of hexamethylene-diamine and adipic acid) with polystyrene
Nylon (condensation copolymer of hexamethylene-diamine and adipic acid) with a copolymer of 85 parts by weight vinylidene chloride and 15 parts by weight vinyl chloride
Nylon (condensation copolymer of hexamethylene-diamine and adipic acid) with polydichlorostyrene
Polyvinyl chloroacetate with a copolymer of 70 parts by weight styrene and 30 parts by weight acrylonitrile
Polyvinyl chloroacetate with polycarbonate resin
Polyvinyl chloroacetate with polystyrene
Polyvinyl chloroacetate with a copolymer of 85 parts by weight vinylidene chloride and 15 parts by weight vinyl chloride
Polyvinyl chloroacetate with polydichlorostyrene
Polyvinylchloride with a copolymer of 70 parts by weight styrene and 30 parts by weight acrylonitrile
Polyvinylchloride with polycarbonate resin
Polyvinylchloride with polystyrene
Polyvinylchloride with a copolymer of 85 parts by weight vinylidene chloride and 15 parts by weight vinyl chloride
Polyvinyl chloride with polydichlorostyrene
Polyethylene (high density linear) with a copolymer of 70 parts by weight styrene and 30 parts by weight acrylonitrile
Polyethylene (high density linear) with polycarbonate resin
Polyethylene (high density linear) with polystyrene
Polyethylene (high density linear) with a copolymer of 85 parts by weight vinylidene chloride and 15 parts by weight vinyl chloride
Polyethylene (high density linear) with polydichlorostyrene
A copolymer of 67 parts by weight methyl methacrylate and 33 parts by weight styrene with a copolymer of 70 parts by weight styrene and 30 parts by weight acrylonitrile
A copolymer of 67 parts by weight methyl methacrylate and 33 parts by weight styrene with polycarbonate resin A copolymer of 67 parts by weight methyl methacrylate and 33 parts by weight styrene with polystyrene A copolymer of 67 parts by weight methyl methacrylate and 33 parts by weight styrene with a copolymer of 85 parts by weight vinylidene chloride and 15 parts by weight vinyl chloride A copolymer of 67 parts by weight methyl methacrylate and 33 parts by weight styrene with polydichlorostyrene A copolymer of 85 parts by weight vinyl chloride and 15 parts by weight vinylidene chloride with polycarbonate resin A copolymer of 85 parts by weight vinyl chloride and 15 parts by weight vinylidene chloride with polystyrene A copolymer of 85 parts by weight vinyl chloride and 15 parts by weight vinylidene chloride with a copolymer of 85 parts by weight vinylidene chloride and 15 parts by weight vinyl chloride A copolymer of 85 parts by weight vinyl chloride and 15 parts by weight vinylidene chloride with polydichlorostyrene Poly-α-methylstyrene with polycarbonate resin Poly-α-methylstyrene with polystyrene Poly-α-methylstyrene with a copolymer of 85 parts by weight vinylidene chloride and 15 parts by weight vinyl chloride Poly-α-methylstyrene with polydichlorostyrene A copolymer of 60 parts by weight styrene and 40 parts by weight butadiene with polycarbonate resin A copolymer of 60 parts by weight styrene and 40 parts by weight butadiene with polystyrene A copolymer of 60 parts by weight styrene and 40 parts by weight butadiene with a copolymer of 85 parts by weight vinylidene chloride and 15 parts by weight vinyl chloride A copolymer of 60 parts by weight styrene and 40 parts by weight butadiene with polydichlorostyrene Neoprene with polycarbonate resin Neoprene with polystyrene Neoprene with a copolymer of 85 parts by weight vinylidene chloride and 15 parts by weight vinyl chloride Neoprene with polydichlorostyrene A copolymer of 70 parts by weight styrene and 30 parts by weight acrylonitrile with polystyrene A copolymer of 70 parts by weight styrene and 30 parts by weight acrylonitrile with a copolymer of 85 parts by weight vinylidene chloride and 15 parts by weight vinyl chloride A copolymer of 70 parts by weight styrene and 30 parts by weight acrylonitrile with polydichlorostyrene Polycarbonate resin with polydichlorostyrene In a manner similar to the foregoing illustration, multilayer fibers and filaments having an iridescent character are readily produced when a filament die plate is substituted for a film or sheeting die. By slitting iridescent multilayer film into narrow strips, filaments are prepared which are readily woven into textile fibers either alone or in combination with other yarns or fibers. Beneficially, such film filaments are twisted or folded to form microtapes and subsequently utilized in textile applications.

As is apparent from the foregoing specification, the apparatus, method and article of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, expecting as it is set forth and defined in the hereto appended claims.

What is claimed is:

1. A thermoplastic resinous integral sheet having at least first and second major surfaces, the sheet having at least about 10 layers of resinous material therein, the layers being disposed generally parallel to the major surfaces, immediately adjacent layers being in direct contact and generally coextensive with each other, the layers are of resinous material which is transparent to visible light and at least 20 percent of the layers are of diverse optical characteristics from immediately adjacent layers and have a thickness of from about 0.05 micron to about 1 micron, the body having at least two pair of adjacent discontinuities in refractive index, each member of a pair being separated by a distance of from about 0.05 to about 1 micron, the body having an iridescent appearance.

2. The sheet of claim 1 wherein adjacent resinous materials have a refractive index difference of at least about 0.03.

3. The sheet of claim 2 wherein the refractive index difference is at least about 0.1.

4. The sheet of claim 1 wherein the thermoplastic resinous sheet is a film having a thickness of from about .25 mil to about 10 mils.

5. The sheet of claim 1 wherein alternate layers are of like composition.

6. The sheet of claim 5 wherein the adjacent layers are polystyrene and polymethyl methacrylate.

7. The sheet of claim 1 wherein the thickness of the sheet is varied in a regular manner.

8. The sheet of claim 1 wherein the sheet is a film and is embossed.

9. The sheet of claim 1 wherein the sheet is of a tubular configuration.

10. The sheet of claim 4 wherein a pressure sensitive adhesive is disposed on at least a portion of a major surface.

11. The sheet of claim 10 wherein the pressure sensitive adhesive is adhered to a substrate.

12. The sheet of claim 4 wherein the sheet is adhered to a colored substrate.

13. The sheet of claim 4 wherein the substrate is opaque.

14. The sheet of claim 4 werein the substrate is a thermoplastic resinous material.

References Cited

UNITED STATES PATENTS

| | | | |
|---|---|---|---|
| 3,152,950 | 10/1964 | Palmquist et al. | 161—167 |
| 3,170,013 | 2/1965 | Ploetz | 264—171 |
| 3,320,636 | 5/1967 | Corbett | 264—171 |
| 3,321,804 | 5/1967 | Breidt, Jr. et al. | 264—171 |
| 3,444,031 | 5/1969 | Schrenk | 161—3.5 |

WILLIAM J. VAN BALEN, Primary Examiner

U.S. Cl. X.R.

161—165, 178, 252, 402; 264—171